US012626433B2

(12) United States Patent
Shankhdhar et al.

(10) Patent No.: US 12,626,433 B2
(45) Date of Patent: May 12, 2026

(54) GENERATING SUPPLEMENTAL TEXT AND IMAGE CONTENT IN MULTIMODAL DIGITAL CONTENT ITEMS VIA MACHINE LEARNING

(71) Applicant: Adobe Inc., San Jose, CA (US)

(72) Inventors: Anant Shankhdhar, New Delhi (IN); Samyak Sanjay Mehta, Mumbai (IN); Shreya Singh, Ahmedabad (IN); K V Vikram, Coimbatore (IN); Tripti Shukla, Lucknow (IN); Srikrishna Karanam, Bangalore (IN); Balaji Vasan Srinivasan, Bangalore (IN); Vishwa Vinay, Bangalore (IN); Niyati Himanshu Chhaya, Bangalore (IN)

(73) Assignee: Adobe Inc., San Jose, CA (US)

( * ) Notice: Subject to any disclaimer, the term of this patent is extended or adjusted under 35 U.S.C. 154(b) by 435 days.

(21) Appl. No.: 18/323,029

(22) Filed: May 24, 2023

(65) Prior Publication Data

US 2024/0394942 A1      Nov. 28, 2024

(51) Int. Cl.
*G06T 11/60* (2006.01)
*G06F 16/58* (2019.01)
(Continued)

(52) U.S. Cl.
CPC .......... *G06T 11/60* (2013.01); *G06F 16/5866* (2019.01); *G06F 40/211* (2020.01); *G06V 30/418* (2022.01)

(58) Field of Classification Search
CPC .... G06T 11/60; G06F 16/5866; G06F 40/211; G06V 30/418
See application file for complete search history.

(56) References Cited

U.S. PATENT DOCUMENTS

2008/0320384 A1* 12/2008 Nagarajan ............... G06F 16/93
                                                          715/255
2012/0163707 A1*  6/2012 Baker .................... G06F 16/58
                                                          382/159
(Continued)

OTHER PUBLICATIONS

"Welcome to Faiss Documentation", webpage <https://faiss.ai/>, 3 pages, retrieved from internet on Sep. 11, 2023.
(Continued)

*Primary Examiner* — Terrell M Robinson
(74) *Attorney, Agent, or Firm* — Keller Preece PLLC

(57) ABSTRACT

The present disclosure relates to systems, non-transitory computer-readable media, and methods for expanding a digital document including a sequence of informational data via supplemental multimodal digital content. In particular, the system expands digital documents with multimodal granular details to dynamically integrate supplemental in-depth information to the digital document. For example, in response to a selection of a specific portion of a digital document, the system generates expanded multimodal content (e.g., text and image content) for the selected portion of the digital document from external text and image sources. Indeed, the system uses existing content from the digital document to select images and combine the selected images with text into image-text pairs that are textually and visually consistent with the digital document. Moreover, the system expands the digital document by inserting the image-text pairs in connection with the selected portion of the digital document.

20 Claims, 16 Drawing Sheets

(51) Int. Cl.
    *G06F 40/211*     (2020.01)
    *G06V 30/418*     (2022.01)

(56)             References Cited

U.S. PATENT DOCUMENTS

| | | | |
|---|---|---|---|
| 2019/0065579 A1* | 2/2019 | Daher | G06F 16/38 |
| 2021/0342399 A1* | 11/2021 | Sisto | G06N 3/045 |
| 2022/0398230 A1* | 12/2022 | Sinha | G06N 20/00 |
| 2025/0061290 A1* | 2/2025 | Gardner | H04L 51/04 |

OTHER PUBLICATIONS

Apache Lucene, "Welcom to Apache Lucene", webpage <https://lucene.apache.org/>, 2 pages, 2011, retreived from the internet on Sep. 11, 2023.

Cai, Guanyu, et al. "Ask & confirm: active detail enriching for cross-modal retrieval with partial query." Proceedings of the IEEE/CVF International Conference on Computer Vision. 2021.

Castro, Santiago, et al. "Fill-in-the-blank as a challenging video understanding evaluation framework." arXiv preprint arXiv:2104.04182 (2021).

Chen, Danqi, and Christopher D. Manning. "A fast and accurate dependency parser using neural networks." Proceedings of the 2014 conference on empirical methods in natural language processing (EMNLP). 2014.

Dr. Ruth Colvin Clark and Dr. Richard E. Mayer. "E-Learning and the Science of Instruction". via Google Books. 3 pages, Feb. 2016, < http://bit.ly/RichardMayer>.

Guthrie, John T., Stan Bennett, and Shelley Weber. "Processing procedural documents: A cognitive model for following written directions." Educational Psychology Review 3.3 (1991): 249-265.

Haveliwala, Taher. Efficient computation of PageRank. Stanford, 1999.

Kirsch, I. S., and A. Jungeblut. "Literacy: Profiles of America's young adults (NAEP Rep. No. 16-PL-02)." New Jersey: Princeton University, National Assessment of Educational Progress of Educational Testing Service (1986).

Koupaee, Mahnaz, and William Yang Wang. "Wikihow: A large scale text summarization dataset." arXiv preprint arXiv:1810.09305 (2018).

Lerner, Paul, et al. "ViQuAE, a Dataset for Knowledge-based Visual Question Answering about Named Entities." Proceedings of the 45th International ACM SIGIR Conference on Research and Development in Information Retrieval. 2022.

Li, Yangguang, et al. "Supervision exists everywhere: A data efficient contrastive language-image pre-training paradigm."arXiv preprint arXiv:2110.05208 (2021).

Lin, Jimmy, et al. "Pyserini: An easy-to-use python toolkit to support replicable ir research with sparse and dense representations." arXiv preprint arXiv:2102.10073 (2021).

Manning, Christopher D., et al. "The Stanford CoreNLP natural language processing toolkit." Proceedings of 52nd annual meeting of the association for computational linguistics: system demonstrations. 2014.

Pang, Liang & Lan, Yanyan & Guo, Jiafeng & Xu, Jun & Xu, Jingfang & Cheng, Xueqi. (2017). DeepRank: A New Deep Architecture for Relevance Ranking in Information Retrieval. 10.1145/3132847.3132914.

Reddy, Mr D. Murahari, et al. "Dall-e: Creating images from text." UGC Care Group I Journal 8.14 (2021): 71-75.

Tarau, Paul, and Eduardo Blanco. "Interactive text graph mining with a prolog-based dialog engine." Theory and Practice of Logic Programming 21.2 (2021): 244-263.

Wielemaker, Jan. "An overview of the SWI-Prolog Programming Environment." WLPE 3 (2003): 1-16.

\* cited by examiner

3. Take out the spare tire and the jack.

800

6. Pump or crank the jack to lift the tire off the ground.

9. Place the spare tire on the hub.

2. Apply parking brake and put car into park position.

5. Remove the hubcap and loosen the nuts.

8. Remove the tire.

1. Find a flat stable surface to change tire.

4. Raise the jack until it is supporting the car.

7. Remove the nuts the rest of the way.

8. If you notice instability, lower the jack and fix the problem.

11. Place the spare tire on the hub.

5. Remove the hubcap and loosen the nuts.

7. Check to make sure that the jack is perpendicular to the ground.

10. Remove the tire.

4. Raise the jack until it is supporting the car.

6. Place the jack under the frame near the tire that you are going to change.

9. Remove the nuts the rest of the way.

6. Pump or crank the jack to lift the tire off the ground.

Click for 3 steps
Score = 0.27

810

5. Remove the hubcap and loosen the nuts.

Click for 3 steps
Score = 0.07

4. Raise the jack until it is supporting the car.

Click for 1 step
Score = 0.10

808

3. Take out the spare tire and the jack.

Click for 5 steps
Score = 0.42

| Sr. No. | Task | Similarity Score |
|---|---|---|
| 1 | How to make cauliflower soup | 0.967741 |
| 2 | How to clean a central air conditioner | 0.963046 |
| 3 | How to drive a bus | 0.960957 |
| 4 | How to make strawberry cheesecake | 0.958717 |
| 5 | How to play basketball | 0.957762 |
| 6 | How to install a door frame | 0.953806 |
| 7 | How to make Dahi | 0.953106 |
| 8 | How to perform CPR | 0.951928 |
| 9 | How to play tag | 0.950302 |

Generating, For A Selected Content Item Of A Digital Document, Text Content Items By Extracting Text From One Or More Digital Documents *1110*

Retrieving Selected Digital Images Based On The Text Content Items *1120*

Modifying The Digital Document By Inserting Image-Text Pairs Comprising Text Content Items And Selected Digital Images *1130*

1212

Computing Device
*1200*

Processor
*1202*

Memory
*1204*

Storage
*1206*

I/O Interface
*1208*

Communication Interface
*1210*

GENERATING SUPPLEMENTAL TEXT AND IMAGE CONTENT IN MULTIMODAL DIGITAL CONTENT ITEMS VIA MACHINE LEARNING

BACKGROUND

Recent years have seen significant improvements in hardware and software platforms for generating and distributing digital documentation, resulting in an increased prevalence of digital documentation for many different subjects. For example, many entities and systems utilize digital documentation including procedural information (e.g., instructions or steps for performing specific processes) or non-procedural information (e.g., travelogs or descriptions of specific topics) with text and/or images to provide users with understanding of different concepts. Because some types of digital content (e.g., text, images) are better for describing/illustrating certain types of content and/or various display environments than others, generating digital documents that utilize the various modalities of communication to accurately and intuitively provide relevant information on various topics can be challenging. Conventional systems, consequently, have a number of shortcomings with regard to flexibility and accuracy in providing digital documentation with multimodal content for providing accurate and efficient understanding of specific concepts.

SUMMARY

Embodiments of the present disclosure solve one or more of the foregoing or other problems in the art with systems, non-transitory computer-readable media, and methods for expanding a digital document including a sequence of informational data via supplemental multimodal digital content. In particular, the system expands informational digital documents with multimodal granular details to dynamically integrate supplemental in-depth information to the digital document. For example, in response to a selection of a specific portion of a digital document, the system generates expanded multimodal informational content (e.g., text and image content) for the selected portion of the digital document from external text and image sources. Indeed, the system uses existing content from the digital document to select images and combine the selected images with text into image-text pairs that are textually and visually consistent with the digital document. Moreover, the system expands the digital document by inserting the image-text pairs in connection with the selected portion of the digital document. The system thus provides flexible and accurate expansion of digital documents with visual and contextual coherence according to the content of the digital documents.

BRIEF DESCRIPTION OF THE DRAWINGS

The detailed description provides one or more embodiments with additional specificity and detail through the use of the accompanying drawings, as briefly described below.

FIGS. 9A-9B illustrate similarity score results for the document expansion system in accordance with one or more embodiments.

DETAILED DESCRIPTION

Figure 1:
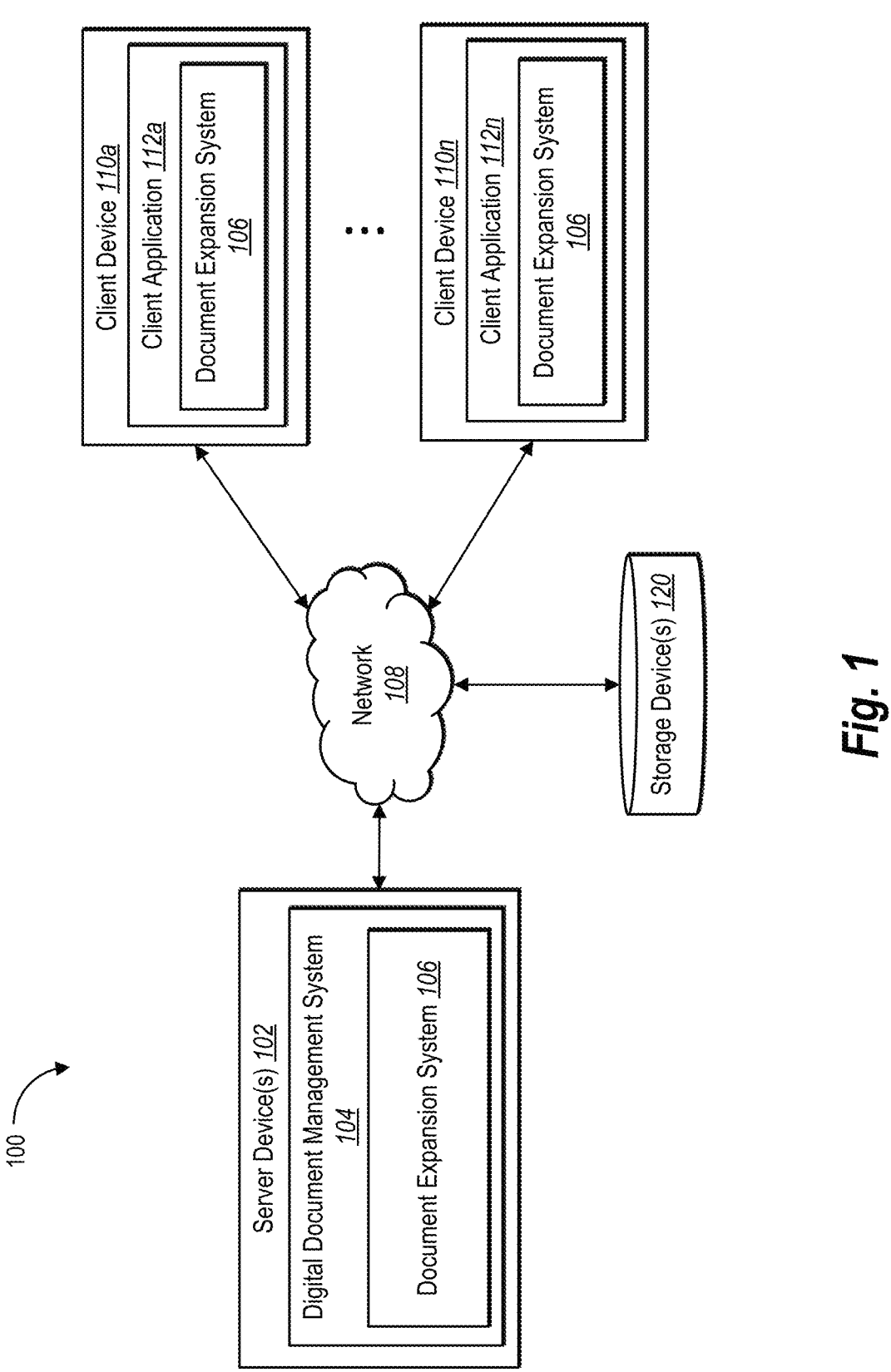
FIG. 1 illustrates a diagram of an environment in which a document expansion system operates in accordance with one or more embodiments.

This disclosure describes one or more embodiments of a document expansion system for expanding a portion of a digital document including a sequence of informational data to provide additional details corresponding to the portion. In particular, the document expansion system expands informational digital documents with multimodal granular details to dynamically integrate supplemental in-depth information to the digital document. For example, in some embodiments, the document expansion system utilizes user interactions with a digital document to dynamically expand a selected content item by leveraging external sources to generate multimodal content to insert into the digital document in connection with the selected content.

As mentioned, in one or more embodiments, the document expansion system performs digital document content expansion by generating expanded multimodal content for a selected content item of a digital document. In particular, in response to an indication of a selected content item (e.g., an image and/or text) of a digital document, the document expansion system accesses external sources to generate multimodal content items including images and text based on the selected content item and additional context from the digital document. Specifically, the document expansion system utilizes external data to generate additional multimodal content to supplement existing information within the digital document while maintaining visual and contextual consistency with the existing information of the digital document.

To illustrate, in one or more embodiments, the document expansion system generates text content items for expanding the selected content item by identifying relevant information extracted from ranked digital documents in a digital document repository based on the similarity of textual content of the supplemental digital documents to the selected content item. In addition, the document expansion system utilizes the generated text content items from the ranked digital documents related to the selected content item to generate queries for retrieving and selecting digital images from an image repository. Furthermore, the document expansion system selects the digital images by identifying digital images that fit the context of the digital document. The document expansion system generates image-text pairs including the text content items and the selected digital images for inserting into the digital document in connection with the selected content item.

As discussed above, conventional systems have a number of technical shortcomings with regard to generating or presenting digital documentation. Indeed, current approaches to delivering information in digital documents often present the document content in an inflexible structured framework or a fixed sequence that does not adequately satisfy user needs. In particular, some current systems provide digital documentation in a single modality (e.g., images, video, or text). As mentioned, however, certain types of content are more useful for presenting information for certain types of content or subjects than others. Accordingly, conventional systems that utilize a single modality lack the ability to accurately present or describe certain information types in digital documentation environments.

Some conventional systems attempt to address the inflexibility of static digital documents by rearranging or modifying document content using a different modality. For example, some of these systems modify a digital text document by restructuring text in the digital text document as a video or a series of images. Such conventional systems, however, have limited utility because the resulting modified digital documents rely on the existing content of the document. For example, these current systems are unable to provide additional clarity and contextual content organization when one or more portions of a digital document are sparse or lack specificity and interpretability.

Due to the static nature of most digital documentation, conventional systems often lack efficiency in providing complete and relevant information within informational digital documents for users having different skill sets, thereby often requiring supplemental user searches for additional digital documentation. Furthermore, because users often lack the requisite understanding of a particular topic to identify additional information relevant to an informational digital document, subsequent searches typically require sifting through a significant amount of data (e.g., text, images, or videos) to obtain useful content. Thus, generating or presenting digital documentation for a given topic via conventional systems can be a time consuming and computationally expensive task.

As indicated above, embodiments of the document expansion system can provide a variety of advantages over conventional information document presentation systems. The embodiments of the document expansion system can improve flexibility, accuracy, and efficiency in generating and presenting dynamic digital documentation. In contrast to conventional systems that generate and present digital documentation including static content, the document expansion system provides flexible expansion of digital documents by expanding indicated portions with additional multimodal content including images and text. Specifically, by generating image-text pairs to insert into a digital document based on a user interaction with a portion of the digital document, the document expansion system provides interactive and comprehensive supplemental information for digital documentation in real-time within an improved graphical user interface.

The document expansion system also provides improved accuracy in connection with generating digital documentation for a variety of topics. In particular, as mentioned, some modalities of content are more useful and clearer for presenting information for some types of content than other types of content. In contrast to conventional systems that focus on a single modality for presenting information associated with a topic, the document expansion system dynamically and automatically supplements content in a digital document with additional relevant multimodal content. For instance, by utilizing existing text and/or images of a digital document to generate additional content retrieved from external sources such as a digital document repository and a digital image repository, the document expansion system can determine a plurality of different methods for accurately presenting information related to the text and images of the digital document. Additionally, by comparing the retrieved data from the external sources to existing image and text content of the digital document, the document expansion system ensures the contextual consistency of the supplemental information with the rest of the digital document.

Additionally, the document expansion system provides improved computing efficiency in connection with generating and presenting digital documentation. For example, in contrast to conventional document presentation systems that provide digital documentation with static content with limited modalities and often require users to perform additional searches within in other applications to obtain clarifying information about document content, the document expansion system provides real-time, interactive expansion of content with a plurality of modalities. Specifically, the document expansion system dynamically modifies a digital document to include supplemental information related to document content by providing interactive, expandable content within a single graphical user interface. Accordingly, the document expansion system reduces computational resources associated with executing additional applications and/or graphical user interfaces to obtain additional information by intelligently generating expanded document content in response to user interactions within a digital document.

Additional detail regarding the document expansion system will now be provided with reference to the figures. For example, FIG. 1 illustrates a schematic diagram of an exemplary system environment ("environment") 100 in which a document expansion system 106 operates. As illustrated in FIG. 1, the environment 100 includes server device(s) 102, a network 108, storage device(s) 120, and client devices 110a-110n.

Although the environment 100 of FIG. 1 is depicted as having a particular number of components, the environment 100 is capable of having any number of additional or alternative components (e.g., any number of servers, client devices, or other components in communication with the document expansion system 106 via the network 108). Similarly, although FIG. 1 illustrates a particular arrangement of the server device(s) 102, the network 108, storage device(s) 120, and the client devices 110a-110n, various additional arrangements are possible.

The server device(s) 102, the network 108, storage device(s) 120, and the client devices 110a-110n are communicatively coupled with each other either directly or indirectly (e.g., through the network 108 discussed in greater detail below in relation to FIG. 12). Moreover, the server device(s) 102 and the client devices 110a-110n include one of a variety of computing devices (including one or more computing devices as discussed in greater detail with relation to FIG. 12).

As illustrated in FIG. 1, the environment 100 includes the server device(s) 102. The server device(s) 102 generates, tracks, stores, processes, receives, and transmits electronic data, including digital documents. In one or more embodiments, a digital document includes an electronic file or record that contains information in a digital format. For example, digital documents include text documents, spreadsheets, presentations, images, audio files, video files, or combinations of different types of content (e.g., text and images). In one or more embodiments, one or more client devices create or edit digital documents using various software applications for storing, sharing, and/or accessing using digital devices and networks. Additionally, in one or more embodiments, multimodal digital documents include digital documents with more than one presentation type of data (e.g., text and images, text and video).

For example, the server device(s) 102 receive or monitor interactions across the client devices 110a-110n. In some implementations, the server device(s) 102 transmit content to the client devices 110a-110n to cause the client devices 110a-110n to display content associated with digital documents. For example, the server device(s) 102 present a digital document to client device 110a and insert supplemental information into the digital document based on the client devices 110a-110n selection of content within the document to be expanded (e.g., provide a modified digital document for display via a user interface of the client device 110a).

In some embodiments, the server device(s) 102 communicates with the client devices 110a-110n to transmit and/or receive content via the network 108. In some embodiments, the server device(s) 102 comprises a distributed server where the server device(s) 102 includes a number of server devices distributed across the network 108 and located in different physical locations. For example, the server device(s) 102 comprise a content server, an application server, a communication server, a web-hosting server, a multidimensional server, or a machine learning server. In additional embodiments, the server device(s) 102 further access and utilize the storage device(s) 120 to store and retrieve information including information related to digital documents, images, audio files, and multi-media content.

Additionally, the server device(s) 102 includes all, or a portion of, the document expansion system 106. For example, the document expansion system 106 operates on the server device(s) 102 to access digital documents, determine content changes, and provide localization of content changes to the client devices 110a-110n. In one or more embodiments, via the server device(s) 102, the document expansion system 106 generates modified digital documents based on sequential content within digital documents. Example components of the document expansion system 106 will be described below with regard to FIG. 10.

Furthermore, as shown in FIG. 1, the illustrated system includes the client devices 110a-110n. In some embodiments, the client devices 110a-110n include, but are not limited to, mobile devices (e.g., smartphones, tablets), laptop computers, desktop computers, or any other type of computing devices, including those explained below in reference to FIG. 12. Some embodiments of client devices 110a-110n are operated by a user to perform a variety of functions via respective client applications 112a-112n. The client devices 110a-110n include one or more applications (e.g., the client applications 112a-112n) that access, edit, modify, store, and/or provide, for display, digital documents. For example, in some embodiments, the client applications 112a-112n include a software application installed on the client devices 110a-110n. In other cases, however, the client applications 112a-112n include a web browser or other application that accesses a software application hosted on the server device(s) 102.

In one or more embodiments, the document expansion system 106 is implemented in whole, or in part, by the individual elements of the environment 100. Indeed, as shown in FIG. 1, the document expansion system 106 is implemented with regard to the server device(s) 102 and/or at the client devices 110a-110n. In particular embodiments, the document expansion system 106 on the client devices 110a-110n comprises a web application, a native application installed on the client devices 110a-110n (e.g., a mobile application, a desktop application, a plug-in application, etc.), or a cloud-based application where part of the functionality is performed by the server device(s) 102.

In additional or alternative embodiments, the document expansion system 106 on the client devices 110a-110n represents and/or provides the same or similar functionality as described herein in connection with the document expansion system 106 on the server device(s) 102. In some implementations, the document expansion system 106 on the server device(s) 102 supports the document expansion system 106 on the client devices 110a-110n.

For example, in some embodiments, the server device(s) 102 select content and/or train one or more machine learning models described herein (e.g., dependency classification model, a natural language processing model, and/or a neural network). The document expansion system 106 on the server device(s) 102 provides selected documents, images, and/or the one or more trained machine learning models to the document expansion system 106 on the client devices 110a-110n for implementation. Accordingly, although not illustrated, in one or more embodiments the client devices 110a-110n utilize the one or more trained machine learning models to generate modified instructional digital documents. In some implementations, the server device(s) 102 select content and/or train machine learning models and also implement the machine learning models.

In some embodiments, the document expansion system 106 includes a web hosting application that allows the client devices 110a-110n to interact with content and services hosted on the server device(s) 102. To illustrate, in one or more implementations, the client devices 110a-110n access a web page or computing application supported by the server device(s) 102. The client devices 110a-110n provide input to the server device(s) 102 (e.g., selected content items). In response, the document expansion system 106 on the server device(s) 102 utilize the trained machine learning models to generate a modified digital document. The server device(s) 102 provide the modified instructional digital document to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server device(s) 102, bypassing the network 108. As another example, the environment 100 includes a third-party server comprising a content server and/or a data collection server.

As previously mentioned, in one or more embodiments, the document expansion system 106 performs digital document content expansion by generating expanded content items, based on a selected content item within a document, and dynamically integrating the expanded multimodal content to create a modified digital document. For instance, FIG. 2 illustrates an overview diagram of the document expansion system 106 expanding a digital document in accordance with one or more embodiments.

Figure 2:
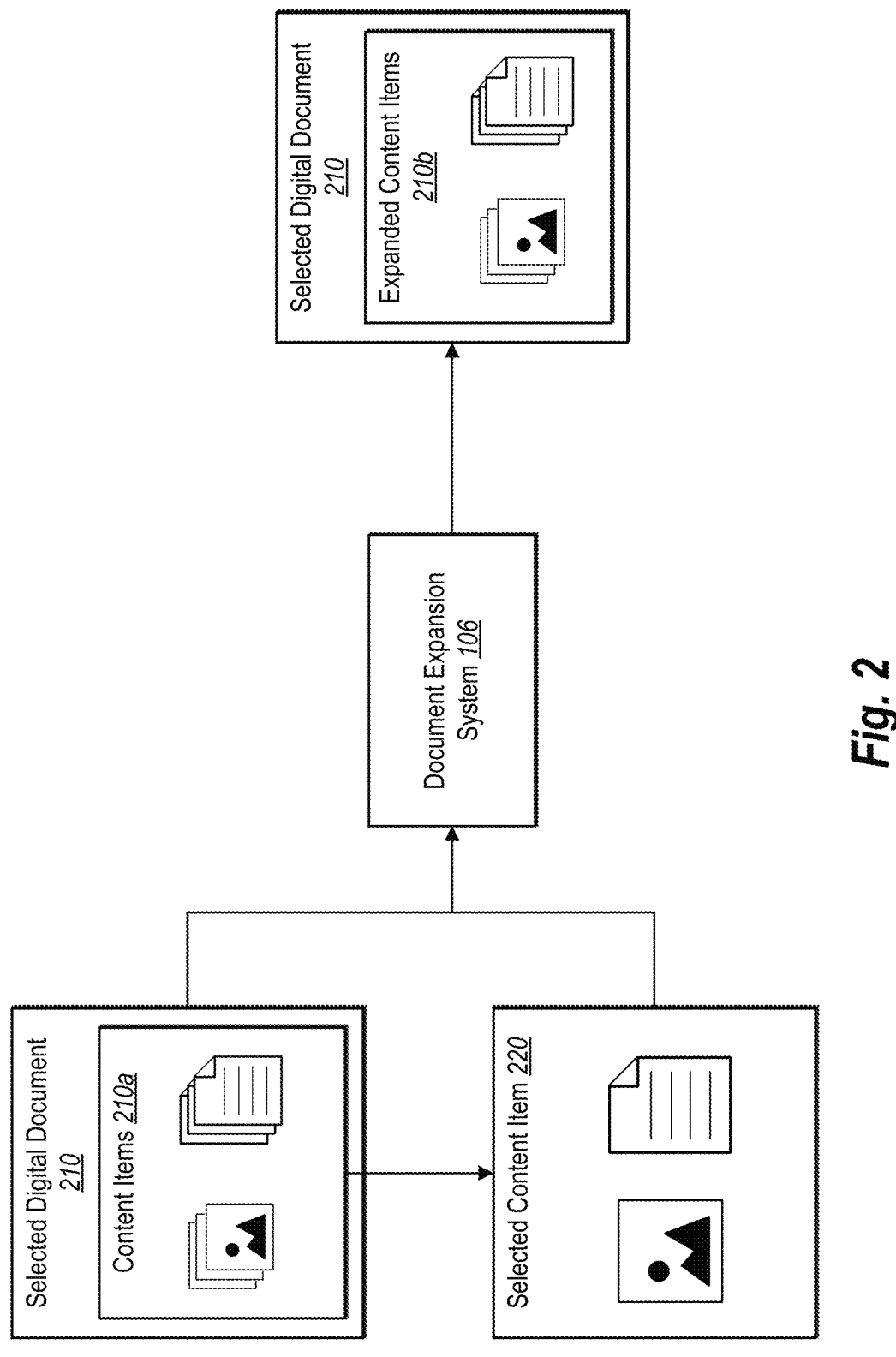
FIG. 2 illustrates an overview diagram of the document expansion system expanding a digital document in accordance with one or more embodiments.

As shown in FIG. 2, the document expansion system 106 determines a selected digital document 210 that comprises multiple content items. In particular, the selected digital document 210 contains ordered content items that comprise informational content, procedural content, or other types of content (e.g., chronological reports, case studies, process documents, project plans, flowcharts, mind maps, storyboards). Indeed, in various embodiments, the selected digital document 210 includes any document that presents information in a sequence. In one or more embodiments, the selected digital document 210 includes a plurality of content items (e.g., text sections, images, videos), with each content item building on the previous one to create a coherent narrative or process. In particular, the selected digital document 210 includes a procedural document that provides step-by-step guidance on how to complete a task or procedure in a logical sequence with each step listed in order. For example, the selected digital document 210 includes documents such as user manuals, operating procedures, work instructions, or regulatory requirements. Additionally, in some embodiments, the selected digital document 210 includes a digital document that provides sequential information about a particular subject or topic. For example, the selected digital document 210 includes documents such as reports, white papers, fact sheets, brochures, and newsletters.

As further shown in FIG. 2, the document expansion system 106 determines a selected content item 220. In one or more embodiments, the document expansion system 106 determines incorporates content items 210a in the selected digital document 210. Specifically, the content items 210a include textual content, images (including videos, diagrams, charts, tables), audio content, interactive elements, and/or multimodal content. In various embodiments, the content items 210a include a wide range of content and are presented in various formats (e.g., paragraphs, lists, tables, or bullet points) or various styles (e.g., formal, informal, academic, or conversational). For example, the selected digital document 210 contains content items 210a comprising text and images or diagrams to illustrate steps involved in a task or process. In an additional example, content items 210a includes tables and charts to present complex information, such as data or statistics, in a sequential format.

In one or more embodiments, the content items 210a include multimodal content to enhance the reader's understanding and improve the user's ability to follow the steps involved in a task or process. In particular, content items 210a include multimodal content items that use a combination of different media or modes, such as text, images, video, audio, and interactive elements. For example, the content items 210a include a combination of images and text (e.g., image-text pairs) to help the reader to visualize the steps more easily and provide additional context that may not be conveyed through text alone. In some examples, the content items 210a include a combination of images, text, audio instructions, tables and/or charts. Notably, the document expansion system 106 system determines the selection of a selected content item 220 from the content items 210a within the selected digital document 210. Furthermore, the content items 210a are organized in a specific order such as within a list or collection of digital content that is arranged in a specific sequence. For example, the content items 210a are arranged in a specific sequential order to convey information within the selected digital document 210 in a particular structure.

As further illustrated, the document expansion system 106 modifies the selected digital document 210 by supplementing the content items 210a. In particular, the document expansion system 106 modifies the selected digital document 210 by inserting supplemental content within the selected digital document 210 in connection with the selected content item 220 to create expanded content items 210b within the selected digital document 210. For example, in one or more embodiments, the document expansion system 106 replaces the selected content item 220 (within the selected digital document 210) with supplemental multimodal image-text pairs to generate expanded content items 210b. Moreover, in one or more embodiments, the document expansion system modifies the selected digital document 210 by inserting multimodal image-text pairs into the selected digital document 210 adjacent to (or otherwise in connection with) the selected content item 220 to generate the expanded content items 210b.

As mentioned, the document expansion system 106 modifies a digital document to include supplemental granular detail about content within the digital document. For instance, FIG. 3 illustrates an overview diagram of the document expansion system 106 inserting a series of image-text pairs into a digital document in accordance with one or more embodiments.

Figure 3:
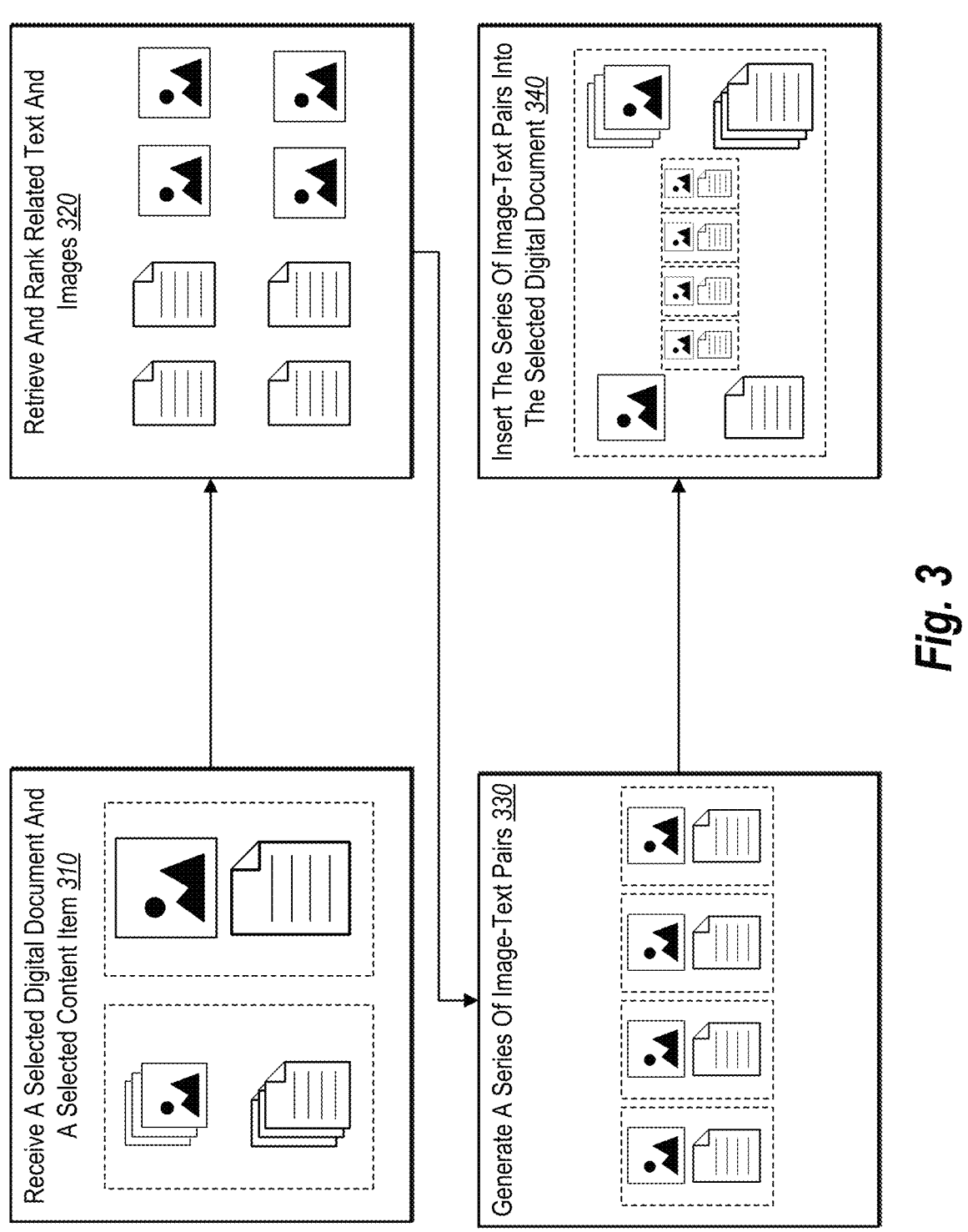
FIG. 3 illustrates an overview of a document expansion system inserting a series of image-text pairs into a digital document in accordance with one or more embodiments.

As shown in FIG. 3, the document expansion system 106 performs act 310 to receive a selected digital document and a selected content item. As mentioned, in one or more embodiments, the document expansion system 106 determines a variety of digital documents that include content items including textual content, images (including videos, diagrams, charts, tables), audio content, interactive elements, and/or multimodal content. Furthermore, the document expansion system 106 determines a selected content item from the digital document. In one or more embodiments, an indication of a selected content item includes a signal that a user device (e.g., based on user input or other signal) has chosen or selected a particular content item from a list or collection of items within a digital document. In one or more embodiments, a user input via a user device to select a content item involves clicking on the content item, tapping on the content item, or using other input methods such as keyboard shortcuts.

In particular, the document expansion system 106 determines a selection of a single type of content, or a combination of types of content, that comprises a content item and/or delineates a discrete portion of the content within the selected digital document. For example, the document expansion system 106 detects a user-initiated selection of a multimodal content item comprising an image-text pair within a sequence of content items of the digital document. To illustrate, the document expansion system 106 detects a user selection of an instructional step within an instructional document describing how to prune a tree, wash a car, personalize a computer, make a citrus spray, or change a tire. In additional examples, the document expansion system 106 determines a user selection of a content item in a non-instructional content sequence within a digital document such as a document describing Indian musicians, great scientists, or news articles.

As further shown in FIG. 3, the document expansion system 106 performs act 320 to retrieve and rank text (e.g., words, phrases, sentences) and images related to selected content within the selected digital document from external text and image sources (e.g., a digital document repository and/or an image repository). In particular, the document expansion system 106 indexes and searches collections of textual data contained in digital documents within a digital document repository utilizing an indexing algorithm, an analyzer, and/or a similarity function (e.g., based on sparse and dense representations of text information). For example, the document expansion system 106 specifies query parameters to retrieve digital document(s) with textual content that is semantically similar to the textual content of the selected digital document and evaluates the quality of the retrieval results using various metrics (e.g., such as mean average precision, normalized discounted cumulative gain). Furthermore, in some embodiments, the document expansion system 106 utilizes a neural network for ranking the retrieved digital document(s) with content that is semantically similar to content within the selected digital document in response to the queries. Additionally, in connection with retrieving relevant digital documents, the document expansion system 106 extracts one or more text content items (e.g., words, phrases, sentences) that provide additional detail related to the selected content item.

Moreover, the document expansion system 106 retrieves relevant images for each text content item extracted from the relevant digital document(s) based upon the extracted text content item and key phrases generated for expanded textual instructions (e.g., related to the extracted text content item) and selects a content relevant subset of images from the retrieved images. In additional embodiments, the document expansion system 106 further re-ranks the selected images based on context information from the selected digital document. For instance, the document expansion system 106 utilizes image features of the selected content item and/or additional images in the selected content item to retrieve the most contextually relevant images in relation to the images present in the selected digital document. Additional detail regarding the document expansion system 106 retrieving images is provided below (e.g., in relation to FIGS. 6-7).

As further illustrated in FIG. 3, the document expansion system 106 performs act 330 to generate a series of image-text pairs. In particular, the document expansion system 106 pairs the retrieved text and the images into image-text pairs and orders the image-text pairs into a sequence. For example, the document expansion system 106 generates a series of image-text pairs that provide granular detail about the selected content item (e.g., how to use a jack when changing a tire). Indeed, the document expansion system 106 generates a series of image-text pairs that are both contextually relevant and content relevant to the existing sequence of content items within the selected digital document (e.g., based on both text and images in the selected digital document).

In addition, the document expansion system 106 performs act 340 to insert the generated series of image-text pairs into the selected digital document in connection with the selected content item. In particular, the document expansion system 106 inserts the series of image-text pairs into the existing sequence of ordered content in the selected digital document. For example, the document expansion system 106 inserts retrieved multimodal content (e.g., a text-image pair) that provides granular detail about how to use a jack when changing a tire into the selected digital document within an ordered sequence of instructions detailing how to change a tire.

Notably, the document expansion system 106 repeats the acts of FIG. 3 to insert a series of image-text pairs into the selected digital document for multiple selected content items. For example, in response to an indication of a second selected content item, the document expansion system 106 performs the act 320 to retrieve and rank related text and images, performs the act 330 to generate a series of image-text pairs, and performs the act 340 to insert the series of image-text pairs into the selected digital document. In some embodiments, the document expansion system 106 repeats the acts of FIG. 3 to insert a series of image-text pairs into the selected digital document in a tiered approach by providing more granular information on newly inserted image-text pairs. For example, based on an indication of a user selection of a content item comprising a newly inserted image-text pair (e.g., a one of the series of image-text pairs inserted by the document expansion system 106 for act 340), the document expansion system 106 performs the act 320 to retrieve and rank related text and images, performs the act 330 to generate a series of image-text pairs, and performs the act 340 to insert the series of image-text pairs into the selected digital document. Indeed, in various embodiments, the document expansion system 106 performs the acts of FIG. 3 repeatedly for multiple content items within the selected digital document.

Figure 4:
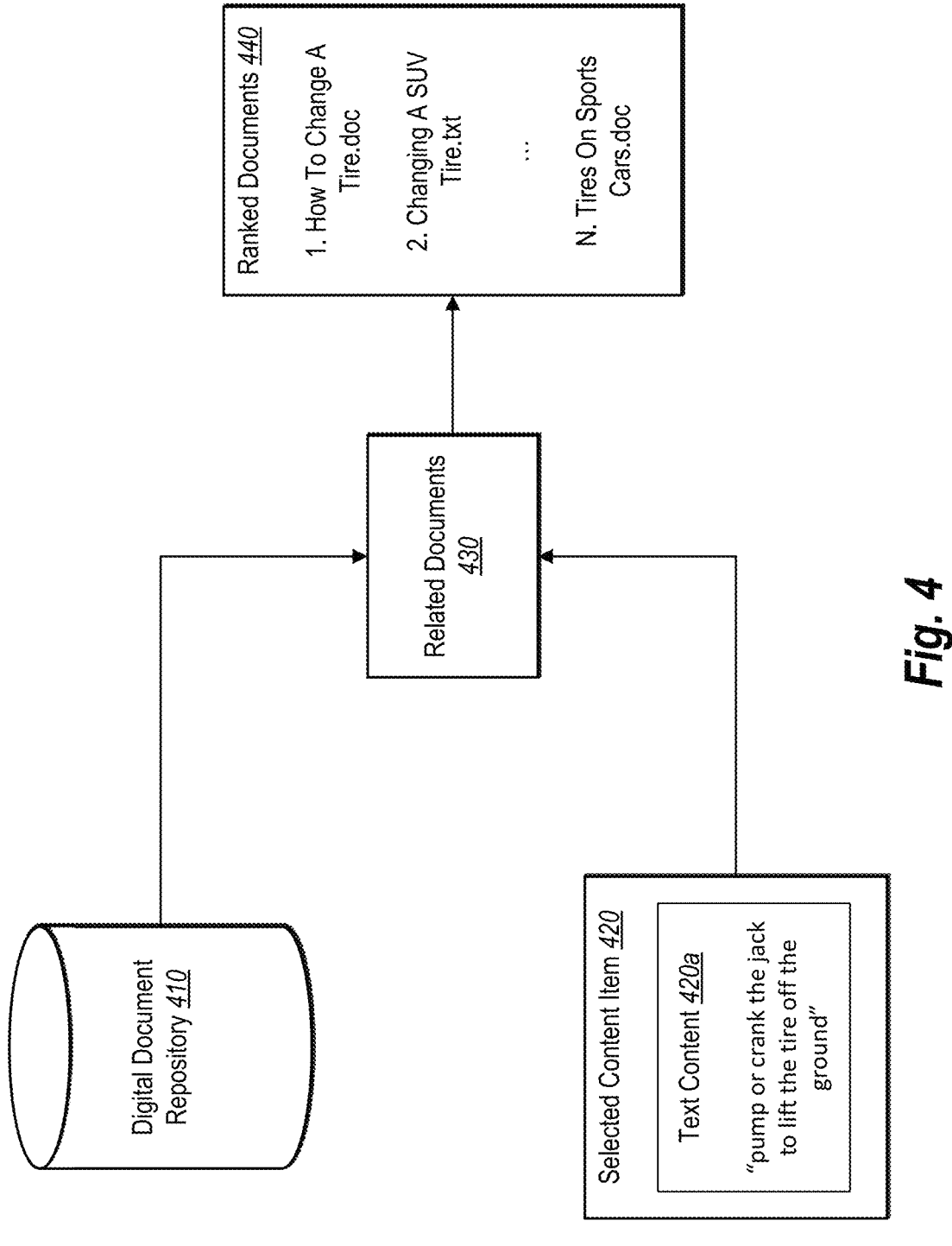
FIG. 4 illustrates an overview of a document expansion system retrieving a plurality of ranked documents based on user selected content in accordance with one or more embodiments.

As mentioned, in some embodiments, the document expansion system 106 retrieves a list of ranked documents related to the selected digital document. For instance, FIG. 4 illustrates a document expansion system 106 retrieving a plurality of ranked documents based on user selected content in accordance with one or more embodiments.

As shown, the document expansion system 106 receives a selected content item 420 that comprises text content 420a from the selected digital document. In one or more embodiments, based on the selected content item 420, the document expansion system 106 performs an information retrieval search from the digital document repository 410 utilizing sparse and dense vector representations. For example, the digital document repository 410 includes a centralized location or system that stores, manages, and organizes digital documents and files. Additionally, in some embodiments, the digital document repository 410 facilitates the storage, retrieval, and sharing of digital documents, as well as supports collaborative workflows and document management processes.

In particular, the document expansion system 106 utilizes sparse vector representations to represent documents from the digital document repository 410 (e.g., a dataset accessible via a website) and associated queries as a set of weighted terms. In one or more embodiments, each weighted term is represented as a dimension of the vector, and the weight corresponds to the importance of the term in the document or query. Specifically, the document expansion system 106, builds inverted indexes (e.g., by creating an index of words and their associated digital documents) from the retrieved digital documents by ranking (e.g., utilizing a bag-of words retrieval function such as BM25, a term frequency—inverse document frequency ("TF-IDF") retrieval function, or a neural ranking model) the retrieved digital document.

According to one or more embodiments, the document expansion system 106 utilizes the frequency of each term in the document/query as the weight to determine the ranked documents 440. For example, in one or more embodiments, the document expansion system 106 indexes relevant documents from the dataset and builds inverted indexes on the document collections by ranking (e.g., using bag-of-words representations) the retrieved documents. In some embodiments, by utilizing sparse representations to perform the document ranking and retrieval, the document expansion system 106 provides representations that are simple and easy to interpret for efficient processing and storage (e.g., utilizing limited computing resources).

In one or more embodiments, the document expansion system 106 determines related documents 430 from the digital document repository using the text content 420a (e.g., within selected content item 420) of the selected digited document as the query for retrieval. In particular, the document expansion system 106 tokenizes the text content 420a (i.e., breaking the text content 420a into individual words and/or generating embeddings representing the individual words), removes stop words (i.e., common words that do not add much meaning), and stems or lemmatizes the words (i.e., reducing the words to their base form). For example, the document expansion system 106 first preprocesses the text content 420a from the digital document repository 410 by cleaning the text content 420a, removing any irrelevant or redundant information, and transforming the text content 420a into a format for indexing. To illustrate, the document expansion system 106 creates a vector representation of each document, where each dimension of the vector representation corresponds to a unique term in the dataset. In some embodiments, the document expansion system 106 also uses several methods for creating these vectors, including bag-of-words models, TF-IDF models, and word embeddings.

In one or more embodiments, the document expansion system 106 creates an index for querying the digital document repository 410 by creating an inverted index. Specifically, each unique term in the digital document repository 410 is associated with a list of documents that contain that term. This allows the document expansion system 106 to retrieve related documents 430 via the inverted index based on search queries including terms or phrases. Additionally, the document expansion system 106 processes search queries and retrieves related documents 430 from the index from the digital document repository 410 by converting the search query into a vector representation. The document expansion system also uses the inverted index to identify related documents 430 and determine the ranked documents 440 based on the query terms. Indeed, the document expansion system 106 ranks the related documents 430 based on their similarity to the selected content item 420 to determine the ranked documents 440.

In one or more embodiments, the document expansion system 106 also trains a model for retrieving documents related to a selected document on historical data including a dataset of queries and relevant documents and annotating them with relevance labels. In one or more embodiments, the dataset includes training, validation, and test sets, with the training set used to optimize the model parameters, the validation set used to tune the hyperparameters, and the test set used to evaluate the final model performance. For example, in one or more embodiments, the document expansion system 106 utilizes a machine-learning model to retrieve relevant sentences from the retrieved digital document(s) by combining convolutional neural networks (CNNs) and recurrent neural networks (RNNs) to learn a distributed representation of the retrieved digital document(s) and the queries. The document expansion system 106 utilizes the CNNs to extract features from the query and document representations and the RNNs to model the interactions between the query and document representations. In one or more embodiments, the model includes a fully connected layer to predict the relevance scores of the documents.

In some embodiments, the document expansion system 106 optimizes/trains the model parameters using backpropagation and stochastic gradient descent (SGD) or other variant. During training, the document expansion system 106 presents the model with a batch of queries and documents and calculates a loss function (e.g., cross-entropy loss or mean squared error) based on the predicted relevance scores and the true relevance labels. The document expansion system 106 determines gradients of the loss function with respect to the model parameters for use in updating the parameters. In one or more embodiments, the document expansion system 106 tunes the hyperparameters of the model, such as the number of layers, the learning rate, and the batch size, on the validation set using techniques such as grid search or random search. In some embodiments, this involves training several versions of the model with different hyperparameter settings and selecting the version with the best performance on the validation set. In one or more embodiments, the document expansion system 106 evaluates the performance of the trained model on the test set using metrics such as mean average precision (MAP), normalized discounted cumulative gain (NDCG), or precision-recall curves.

Figure 5:
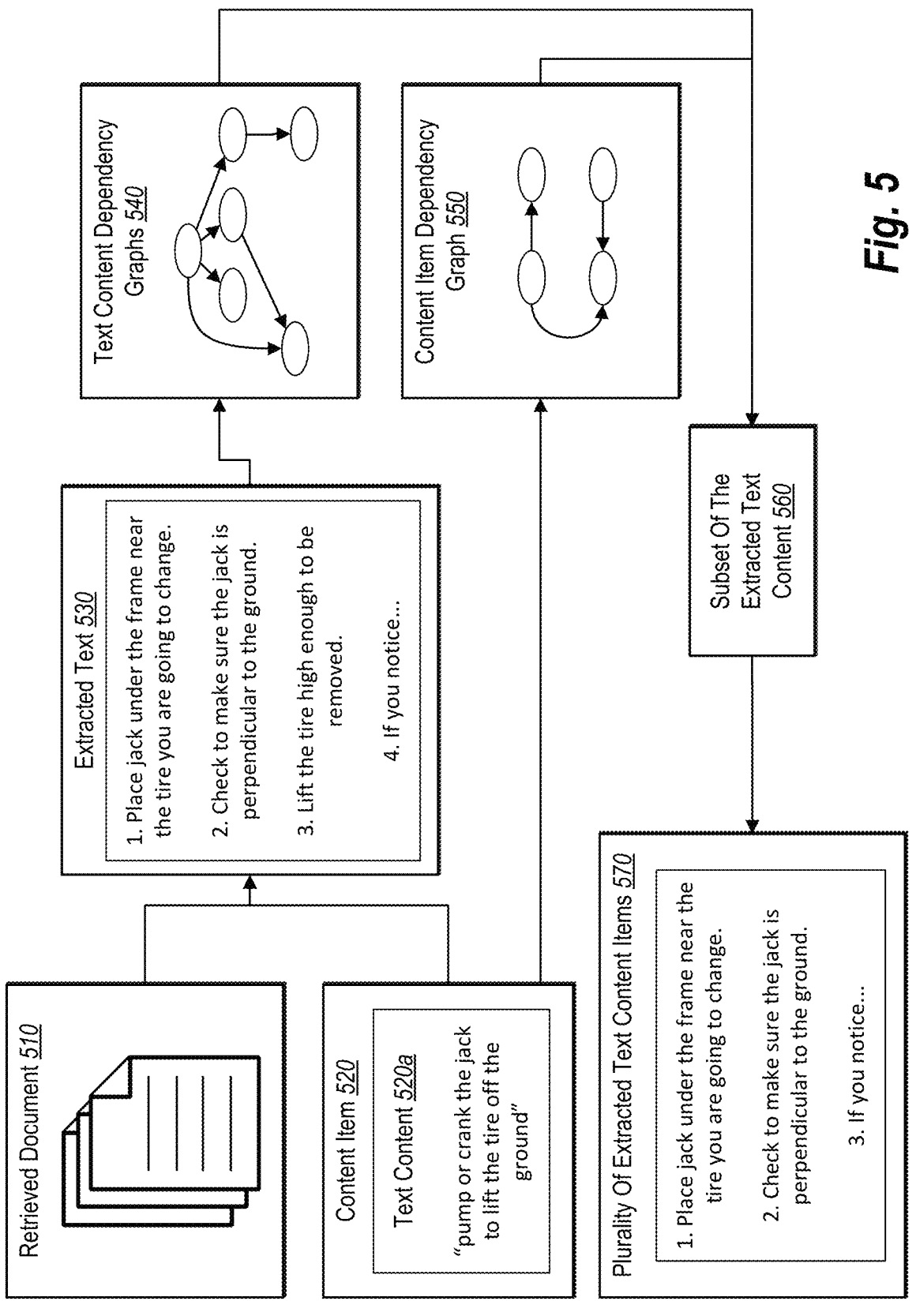
FIG. 5 illustrates an example of expanding a content item from a digital document utilizing dependency graphs to determine a plurality of supplemental text content items in accordance with one or more embodiments.

As mentioned, in one or more embodiments, the document expansion system 106 determines granular textual content that amplifies the original textual content of a selected content item. For instance, FIG. 5 illustrates an example of expanding a content item from a digital document utilizing dependency graphs to determine a plurality of supplemental text content items in accordance with one or more embodiments.

As shown, the document expansion system 106 utilizes the retrieved document 510 and a selected content item 520 from a selected digital document to obtain extracted text 530 from the retrieved document 510. In particular, the document expansion system 106 selects one or more of the ranked documents 440 of FIG. 4 to determine the retrieved document 510. Further, in some embodiments, the document expansion system 106 selects a subset of content from the selected content item 520 to generate text content 520a (e.g., by determining text in a selected image-text pair).

As shown, the document expansion system 106 utilizes the retrieved document 510 and the selected content item 520 to determine extracted text 530. In one or more embodiments, to generate the extracted text 530, the document expansion system 106 utilizes relevance ranking and/or a neural network (e.g., a natural language processing model) to capture the relationships between words and their syntactic roles in sentences within the retrieved document 510. In particular, the document expansion system 106 uses relevance ranking to generate dependency links and text graphs that represent the relationships between words in the retrieved document 510. For example, the document expansion system 106 uses dependency links to represent the syntactic relationships between words in sentences from the retrieved document 510, including the subject-verb or object-verb relationships. By analyzing these relationships, the document expansion system 106 builds a graph that captures the structure of the retrieved document 510 and the relationships between its content. In one or more embodiments, the document expansion system 106 uses recursive neural tensor networks (RNTNs) to model complex hierarchical structures and build the text graph. Indeed, in some embodiments, the document expansion system 106 uses a centrality algorithm to extract relevant key phrases, summaries, and relationships from the retrieved document 510.

For each query, the document expansion system 106 extracts the most relevant sentences covering the document to obtain the extracted text 530.

As further illustrated in FIG. 5, the document expansion system 106 generates the text content dependency graphs 540. In one or more embodiments, a content dependency graph includes a logical representation of the relationships and dependencies between pieces of content in a system or application. In particular, the document expansion system 106 identifies the syntactic relationships between the words and sentences of the extracted text 530, such as subject-verb or object-verb relationships (e.g., using a natural language processing model) to generate dependency graphs for the retrieved document 510. In one or more embodiments, the vertices in the dependency graphs represent words and their part-of-speech tags, and labelled edges in the dependency graphs represent the syntactic heads of word. The document expansion system 106 utilizes part-of-speech tags assigned to vertices (words) and edge labels (syntactic dependencies between words) and generates the text content dependency graphs 540 to extract rank-ordered information corresponding to content elements present in the extracted text 530. In one or more embodiments, the document expansion system 106 generates a dictionary of keywords present in the retrieved document 510 and determines ranks for the dictionary of keywords.

As further illustrated, the document expansion system 106 creates a content item dependency graph 550. Similar to the method described above, the document expansion system 106 creates the content item dependency graph 550 for the input query sentence determined from the text content 520*a* by identifying the syntactic relationships between the words in the text content 520*a*. For example, the document expansion system 106 can use dependency parsing (e.g., using methods such as latent semantic analysis (LSA) or word embeddings) to identify the syntactic relationships between words in the sentence, such as subject-verb or object-verb relationships.

In one or more embodiments, the document expansion system 106 creates edges between words based on these relationships, constructs the graph, and calculates a score for each node (e.g., word) in the graph based on connections to other words in the graph. For example, words that are connected to many other words, or that are connected to high-scoring words, have higher scores. The document expansion system 106 uses the resulting scores to rank the importance or relevance of the words in the sentence. For example, the document expansion system 106 considers words with high scores to be more central or meaningful to the overall meaning of the sentence, while considering words with low scores to be less important or peripheral. For example, the document expansion system 106 ranks the keywords of the input query (e.g., selected content item 520) through use of word-to-word links in the content item dependency graph 550.

As further illustrated, the document expansion system 106 generates a subset of the extracted text 560. In particular, the document expansion system 106 determines one or more phrases or sentences that are the most relevant to the selected content item 520 according to the algorithms described above. The document expansion system 106 uses the rankings from the text content dependency graphs 540 and the content item dependency graph 550 to prioritize the highest ranked sentences from the extracted text 530 that are connected to the highest ranked nodes in the text content dependency graphs 540 (e.g., via natural language processing). Thus, the document expansion system 106 uses a comparison of the text content dependency graphs 540 and the content item dependency graph 550 to select a subset of the sentences of the retrieved document 510 based on their semantic relevance to the selected content item 520.

In one or more embodiments, the document expansion system 106 re-ranks the content of the retrieved document 510 based on the selected content item 520 using a combination of interoperating algorithms. For example, the document expansion system 106 utilizes a machine-learning model for ranking query results with a dictionary of the highest-ranking lemmas and their ranks in the content item dependency graph 550, followed by re-ranking the text content dependency graphs 540 according to a query generated from the text content 520*a*. Specifically, the document expansion system 106 determines the plurality of extracted text content items 570 by comparing SVO-relations (subject-verb-object) of the text content dependency graphs 540 and content item dependency graph 550 and edges of the text content dependency graphs 540 and the content item dependency graph 550. In addition, the document expansion system 106 expands the query guided by the rankings in the text content dependency graphs 540 and the content item dependency graph 550. In some embodiments, the document expansion system 106 determines the plurality of extracted text content items 570 based on matching guided by a selection of related content components in a short-term dialog memory window.

In particular, the document expansion system 106 organizes the subset of the extracted text 560 to determine the highest-ranked sentences based on relevance to the selected content item 520 and the order in which they appear in the retrieved document 510 to determine the plurality of extracted text content items 570. In one or more embodiments, the document expansion system 106 takes a weighted average of the scores of all extracted sentences for a selected content item 520 to determine a final score that indicates the average similarity of the extracted sentences to the selected content item 520. In this way, the document expansion system 106 determines the textual coherence of the extracted sentences as a group. Additionally, in one or more embodiments, the document expansion system 106 organizes the subset of the extracted text 560 to return the highest-ranked sentences as the plurality of extracted text content items 570 based on relevance to the selected content item 520 and in the order in which they appear in the retrieved document 510.

To illustrate, to determine the plurality of extracted text content items 570, the document expansion system 106 re-ranks the extracted text 530 from a retrieved document 510 by accounting for the original placement of the extracted text 530 in the retrieved document 510. For example, as shown in FIG. 5, the document expansion system 106 selects three items of extracted text 530 from within the retrieved document 510, the document expansion system 106 determines the order of the plurality of extracted text content items 570 based on the positions of words or phrases in the extracted text 530 within the retrieved document 510. Indeed, as shown in FIG. 5, the document expansion system 106 retrieves "1. Place jack under the frame near the tire you are going to change," "2. Check to make sure the jack is perpendicular to the ground," and "3. If you notice . . . " and determines an order of the plurality of extracted text content items 570 based on their original order in the retrieved document 510.

Similarly, in one or more implementations, to determine the plurality of extracted text content items 570, the document expansion system 106 can re-rank extracted text from a plurality of retrieved documents (e.g., including the retrieved document 510) by accounting for the original placement of the extracted text 530 in the plurality of retrieved documents. To illustrate, the document expansion system 106 can use three retrieved documents to generate three items of extracted text (e.g., one item of extracted text from each of the three retrieved documents). The document expansion system 106 determines the order of the plurality of extracted text content items 570 based on the location of each item of extracted text within each of the three retrieved documents and/or based on additional natural language processing that determines a semantic order of the different items in the different documents. Thus, the document expansion system 106 integrates the three items of extracted text from the different documents into a specific order for the plurality of extracted text content items 570.

In one or more embodiments, the document expansion system 106 repeats the operations shown in FIG. 5 to modify the selected digital document for multiple content items and/or multiple subsets of content from the selected content item 520. For example, in response to an indication of a second selected content item, the document expansion system 106 obtains a second retrieved document 510 and a second content item and complete the acts as shown in FIG. 5. The document expansion system 106 further determines dependency graphs for the second content item and corresponding extracted text content items from the retrieved document 510 to select a subset of the corresponding extracted text content items.

Figure 6A:
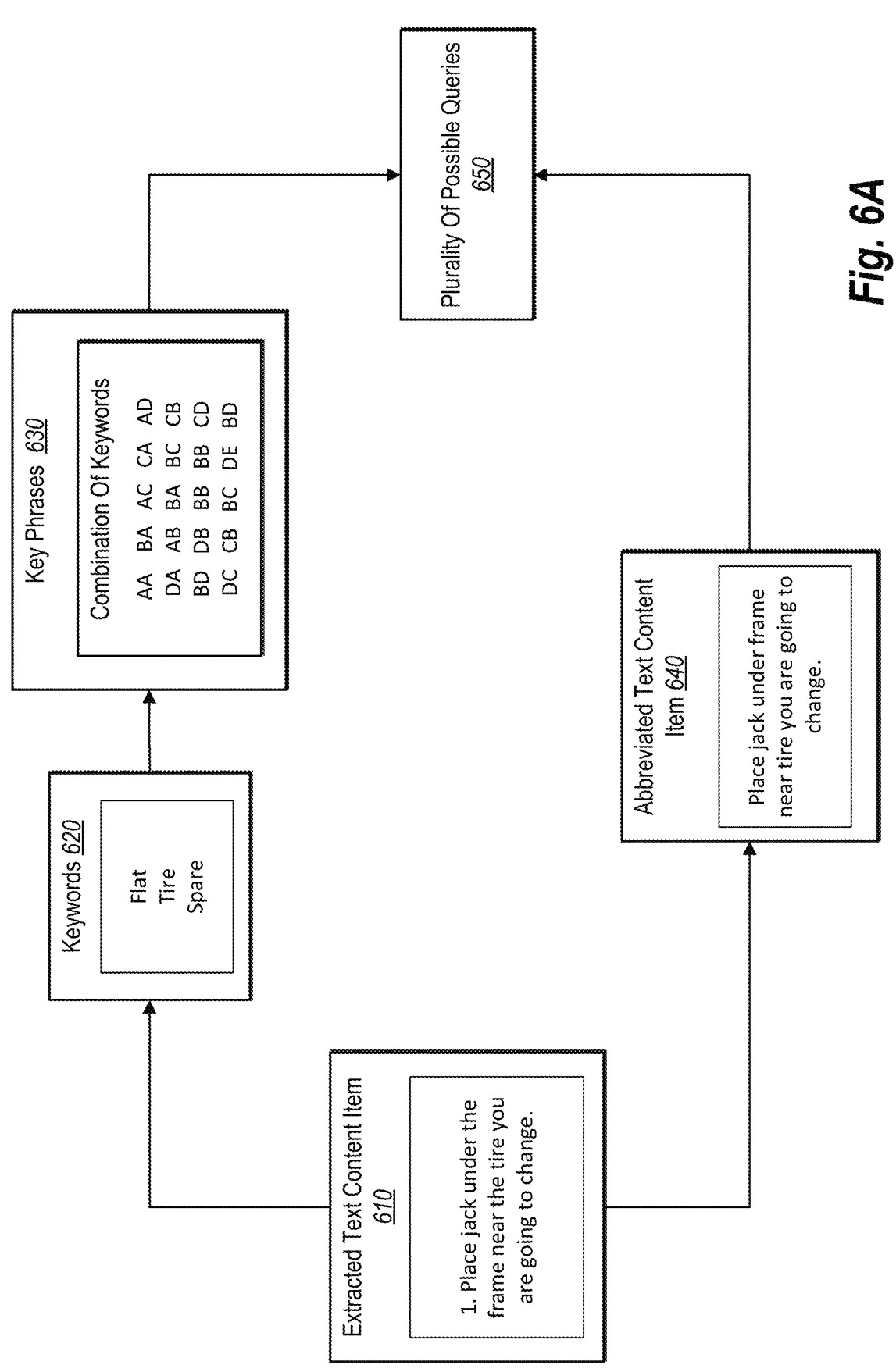
FIGS. 6A-6B illustrate the document expansion system generating image-text pairs comprising text content items and retrieved digital images in accordance with one or more embodiments.
Figure 6B:
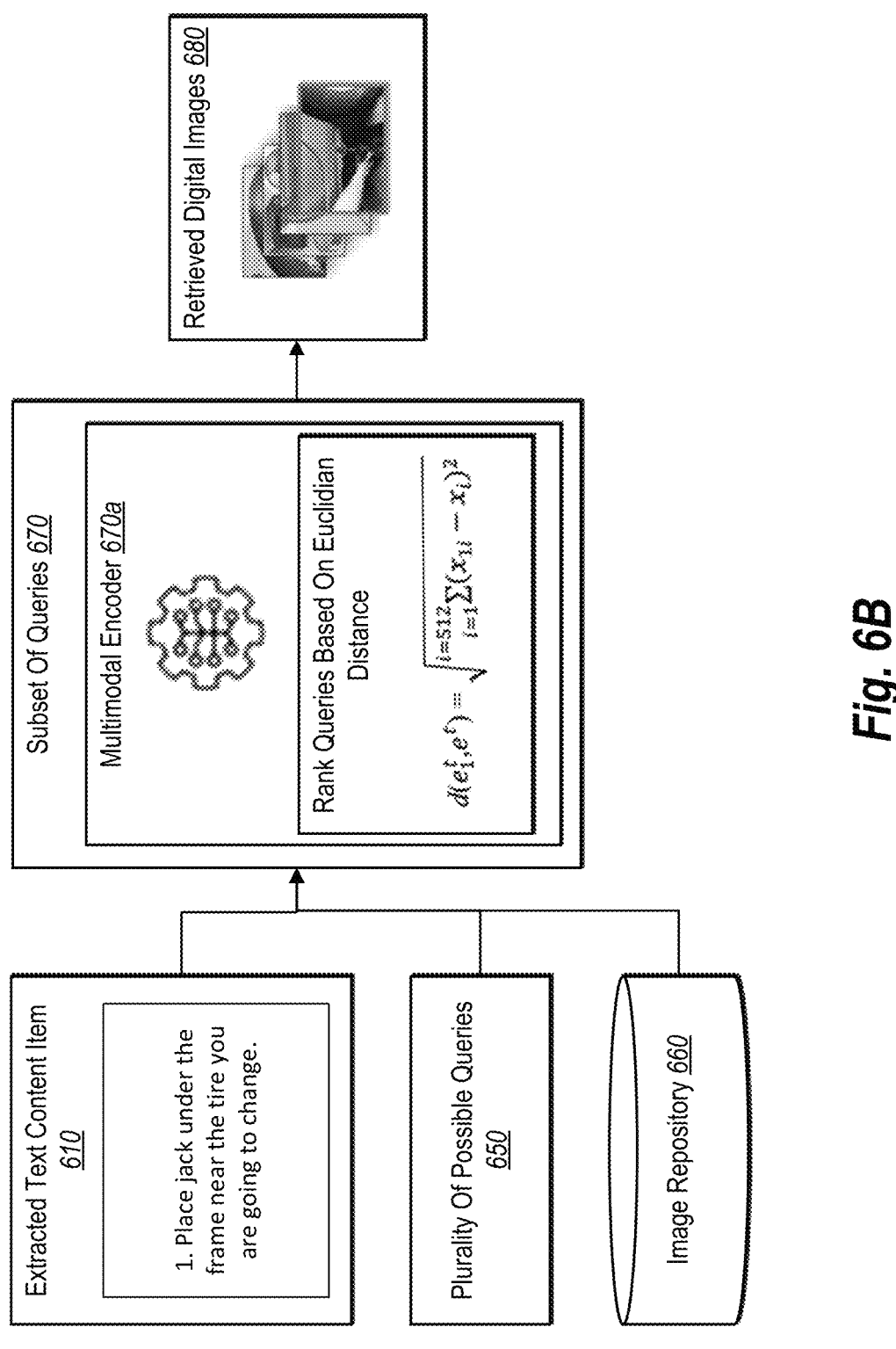

As mentioned, in one or more embodiments, the document expansion system 106 generates expanded content items for a selected content item of a digital document by obtaining images that fit within the context of the selected digital document. For instance, FIGS. 6A-6B illustrate the document expansion system 106 generating image-text pairs comprising text content items and retrieved digital images in accordance with one or more embodiments.

To improve the accuracy and efficiency of a digital image search, the document expansion system 106 creates a query based on a modification of extracted text content items of a document. In some embodiments, extracted text content items are structured in a way that limits a digital image search, resulting in the document expansion system 106 disregarding relevant images). Thus, in some embodiments, the document expansion system 106 modifies an initial query to improve the image search results to include additional relevant images.

According to one or more embodiments, the document expansion system 106 utilizes a representative set of queries to perform an image search. For example, the document expansion system 106 utilizes a set of extracted text content items (e.g., the plurality of extracted text content items 570 of FIG. 5) and selects an extracted text content item 610 to use as the basis for generating a search query. To illustrate, as shown, the document expansion system 106 selects the extracted text content item "Place jack under the frame near the tire you are going to change."

In addition, the document expansion system 106 extracts keywords 620 from the extracted text content item 610. In one or more embodiments, the keywords 620 include single words or short phrases that represent the main topics or themes of a piece of content. For example, in a digital document about gardening, some potential keywords include "gardening," "plants," "flowers," "soil," and "landscaping." Using combinations of these keywords 620, the document expansion system 106 generates key phrases 630 for the search query. In one or more embodiments, the key phrases 630 include combinations of the keywords 620. Specifically, the document expansion system 106 generates the key phrases 630 by determining a plurality of different combinations of keywords 620. For example, a key phrase for the same gardening blog post described above include "gardening plants," "planting flowers," "flower soil," etc.

Furthermore, in some embodiments, the document expansion system 106 generates an abbreviated text content item 640 by removing stop-words from the extracted text content item 610. In the context of the document expansion system 106, the abbreviated text content item 640 includes words or phrases that the document expansion system 106 determines most closely convey the extracted text content item 610 main point or purpose without stop-words (e.g., filler words, articles). Thus, the document expansion system 106 avoids the situation where the key phrases miss the semantics of the extracted text content item. Specifically, the document expansion system 106 determines one or more shortened versions of the extracted text content item that retain the original semantics. Based on the abbreviated text content item 640 and the key phrases 630, the document expansion system 106 determines a plurality of possible queries 650.

As further shown in FIG. 6B, in order to retrieve an appropriate image for the extracted text content item 610, the document expansion system 106 utilizes an image repository 660 that contains of multiple context-relevant images. In one or more embodiments, an image repository stores and/or manages digital images. In one or more embodiments, the document expansion system 106 utilizes an image repository 660 that allows client devices to upload, edit, organize, and search for images. To illustrate, the image repository 660 includes an image database accessible via a network connection (e.g., via a web browser or FTP link). Alternatively, the document expansion system 106 includes the image repository 660.

In one or more implementations, to reduce redundancy of the image search results, the document expansion system 106 limits the number of searched queries (e.g., to less than five, or less than ten). Furthermore, in one or more embodiments, the document expansion system 106 a multimodal encoder 670a (e.g., a neural network trained on image-text pairs), which extracts text features from the plurality of possible queries 650. Additionally, the document expansion system 106 utilizes the multimodal encoder 670a to extract textual features from an expanded text content item (e.g., the extracted text content item 610). The document expansion system 106 compares the text features of the expanded text content item to the text features of the plurality of possible queries 650 to obtain a subset of queries 670, which includes the top closest queries (e.g., top five or top seven closest queries).

To illustrate, in one or more embodiments, the document expansion system 106 utilizes the following functions to determine the subset of queries 670 as follows: $t_1, t_2, \ldots, t_K$ represents feature vectors associated with the key phrases from an extracted text content item, and t represents the extracted text content item. The document expansion system 106 utilizes the multimodal encoder 670a (e.g., a CLIP encoder) to obtains the following embeddings, $$e_1^t, e_2^t, \ldots, e_K^t = \text{CLIP-Text-Encoder}(t_1, t_2, \ldots, t_K)$$

$$e^t = \text{CLIP-Text-Encoder}(t)$$

The document expansion system 106 indexes the text feature vectors $t_1$, $t_2$, . . . , $t_K$ by measuring the L2 or Euclidean distance for all given points between the key phrase feature vectors, and the query feature vector. For example, $$e_1^t$$

and $e^t$ are represented as:

$$e_1^t = (x_{(11)}, x_{(12)}, \ldots, x_{(1512)})$$

$$e^t = (x_1, x_2, \ldots, x_{512})$$

In one or more embodiments, the Euclidean distance $d(e_1^t, e^t)$ is given by:

$$d(e_1^t, e^t) = \sqrt{\sum_{i=1}^{i=512} (x_{1i} - x_i)^2}$$

For comparison, the document expansion system 106 ranks the square of $$d(e_1^t, e^t)$$

for all $t_j$ in the key phrase vector list to rank the text. The document expansion system 106 selects the key phrases with minimum distances (e.g., seven key phrases) to obtain the subset of queries 670 for the extracted text content item. The document expansion system 106 accesses the image repository 660 (e.g., via an application programming interface) to download images using the final set of queries. The document expansion system 106 utilizes the subset of queries 670 to obtain retrieved digital images 680 from the image repository 660 (e.g., in a plurality of query operations utilizing the subset of queries 670).

Figure 7:
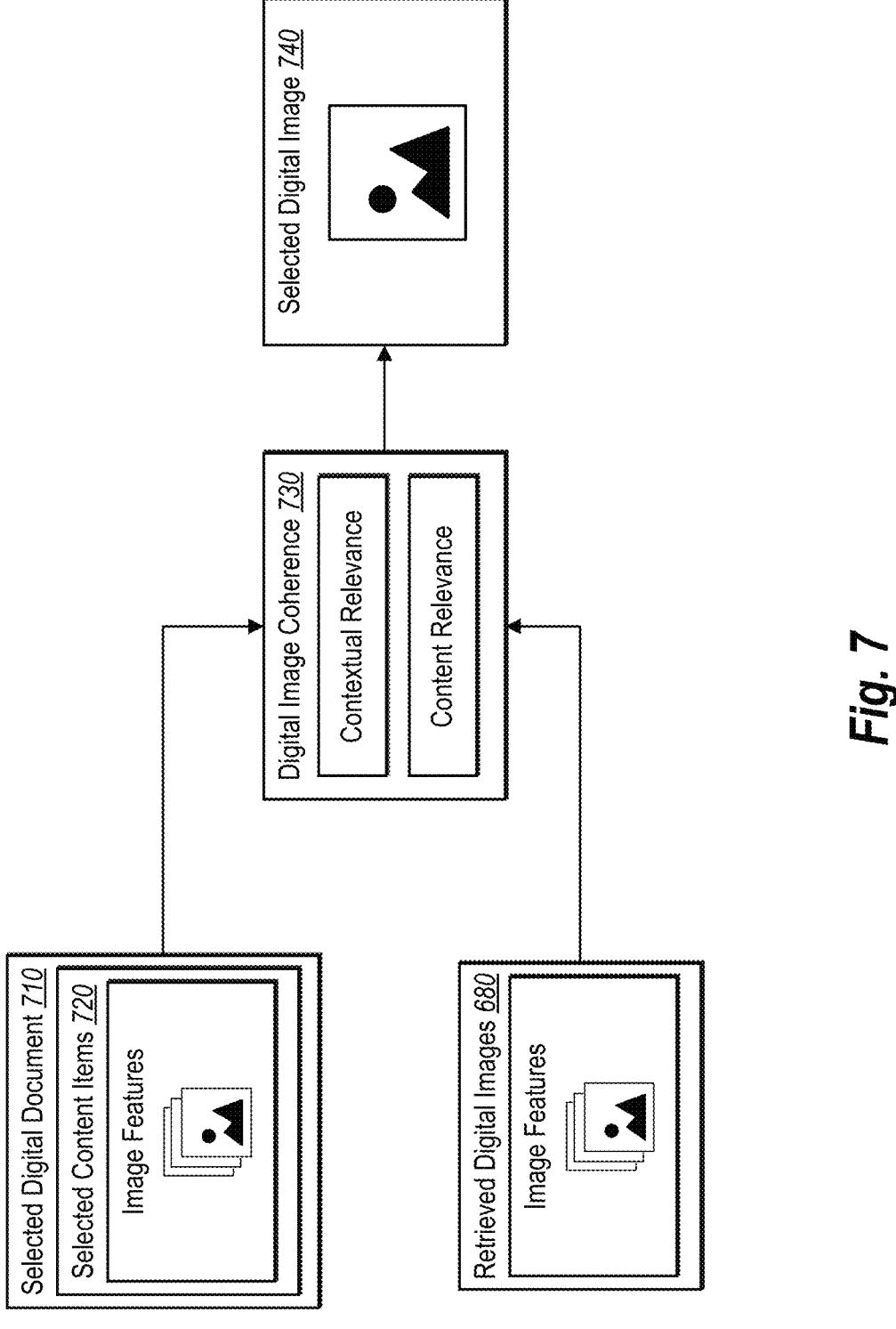
FIG. 7 illustrates selecting contextually consistent digital images for a digital document in accordance with one or more embodiments.

In one or more embodiments, the document expansion system 106 selects digital images conveying visual information for extracted text content item by selecting images that convey the textual content and based on contextual information in a digital document. For example, the document expansion system selects images that are coherent to the existing images within the digital document in terms of visual information, design, feel, balance, proximity, contrast, and/or color scheme. For instance, FIG. 7 illustrates the document expansion system 106 selecting contextually consistent digital images for a digital document in accordance with one or more embodiments.

As mentioned, the document expansion system 106 selects images that are content relevant (e.g., informative, and close to the extracted text content item) and contextually relevant (e.g., visually coherent to the existing images in terms of colors and design). Specifically, the document expansion system 106 determines digital images that are both semantically and contextually relevant to the contents of a digital document for a selected content item. Indeed, the document expansion system 106 filters out digital images that convey meaning of the extracted text content item 610 but are not contextually consistent with the existing images from the selected digital document. Accordingly, in some embodiments, the document expansion system determines an initial set of digital images and reduces the initial set of digital images to a final set of digital images based on content and contextual relevance.

For example, as shown, the document expansion system 106 determines digital image coherence 730 for a plurality of digital images by selecting digital images that have both contextual relevance and content relevance. As described above in relation to FIGS. 6A-6B, the document expansion system 106 selects digital images that are content relevant to determine the retrieved digital images 680. Additionally, to pick the most suitable contextual images, the document expansion system 106 re-ranks the retrieved digital images 680 by extracting image features for the retrieved digital images 680 (e.g., using a neural network encoder). In one or more embodiments, image features include a representation (e.g., one or more vectors) of specific characteristics or attributes of an image. In some embodiments, the document expansion system uses the image features describe and/or perform operations on digital images based on the visual content of the digital images. For example, image features include color features, texture features, shape features, spatial features, content features, or scale-invariant features. The document expansion system 106 ranks the image feature by comparing the image features of the retrieved digital images 680 to the image features of one or more digital images present in the selected digital document 710 (e.g., a digital image from the selected content item 720 or a digital image from another content item).

To illustrate, in one or more embodiments, the document expansion system 106 performs operations as follows: $i_1$, $i_2$, . . . , $i_K$ represents the retrieved digital images 680, and $I$ represents the digital image for the chosen content item (e.g., the digital image from the selected content item 720). The document expansion system 106 obtains the following using a multimodal encoder:

$$e_1^i, e_2^i, \ldots, e_K^i = \text{CLIP-Image-Encoder}(i_1, i_2, \ldots, i_K)$$

$$e^I = \text{CLIP-Image-Encoder}(I)$$

$$e_1^i = (x_{(11)}, x_{(12)}, \ldots, x_{(1512)})$$

$$e^I = (x_1, x_2, \ldots, x_{512})$$

$$d(e_1^i, e^I) = \sqrt{\sum_{i=1}^{i=512} (x_{1i} - x_i)^2}$$

The document expansion system 106 ranks the retrieved digital images 680 based on minimization of the square of the Euclidean distances $$d(e_1^i, e^I)$$

for all $i_j$ in the retrieved digital images 680 to obtain the selected digital image 740 that is contextually closest to the digital image from the selected content item 720. In some embodiments, the document expansion system 106 selects more than one digital image based on the rankings of the retrieved digital images 680. For example, the document expansion system 106 determines more than one digital image to include with a single text content item in an image-text pair.

As mentioned, the document expansion system 106 takes a selected document and a selected content item and expands the content item by inserting multimodal image-text pairs into the sequential content of the selected document. For example, FIGS. 8A-8C illustrate inserting supplemental image-text pairs into a digital document in accordance with one or more embodiments.

Figure 8A:
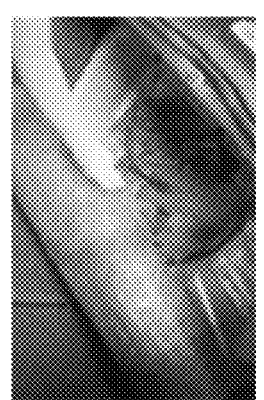
FIGS. 8A-8C illustrate inserting supplemental image-text pairs into a digital document in accordance with one or more embodiments.
Figure 8A:
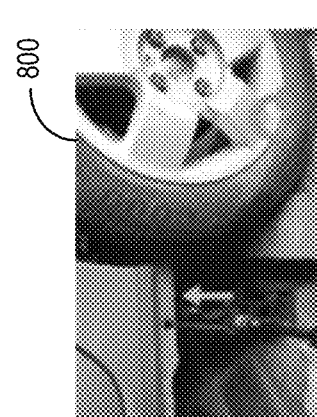
Figure 8A:
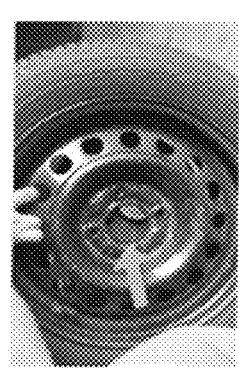
Figure 8A:
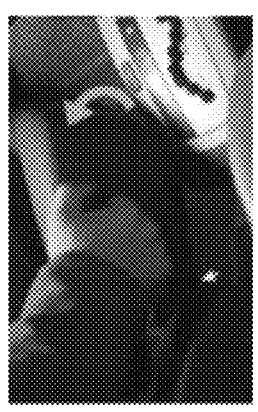
Figure 8A:
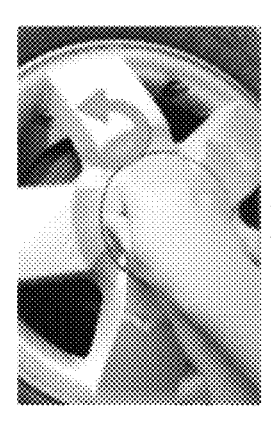
Figure 8A:
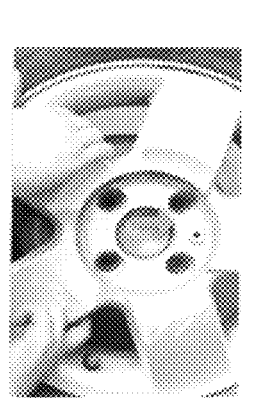
Figure 8A:
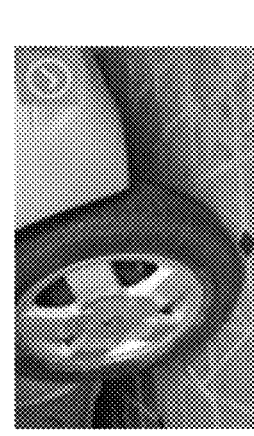
Figure 8A:
Figure 8A:

FIG. 8A shows content from a selected digital document that includes a plurality of steps in a process related to changing a tire in an image-text pair format. As shown, the content items of the selected digital document contain instructions for the user to first find a flat stable surface to change the tire, apply the parking brake and put the car into park position, take out the spare tire and the jack, etc. In FIG. 8A, the Step 6 of "pump or crank the jack to lift the tire off the ground" (e.g., the digital content item 800) might be unclear to a novice user attempting to use the illustrated instructions to change a tire. Thus, as outlined below, the document expansion system 106 provides expanded content related to Step 6 in response to a selection of the digital content item 800.

Figure 8B:
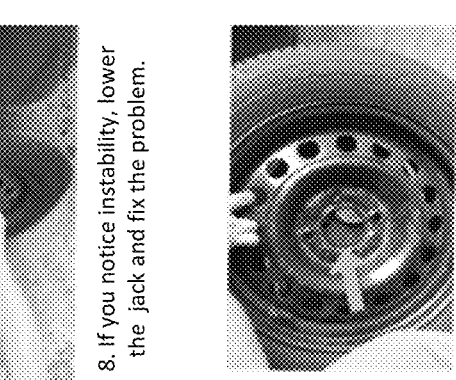
Figure 8B:
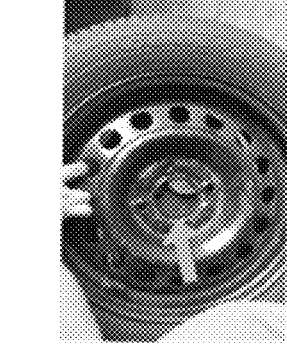
Figure 8B:
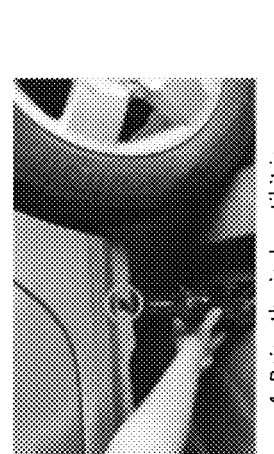
Figure 8B:
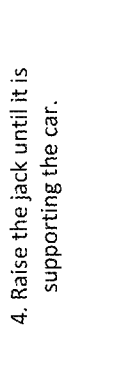
Figure 8B:
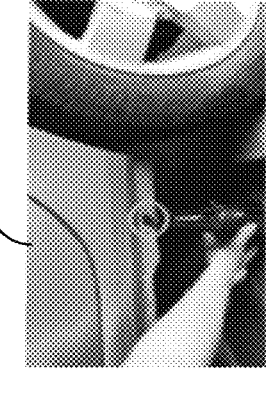
Figure 8B:
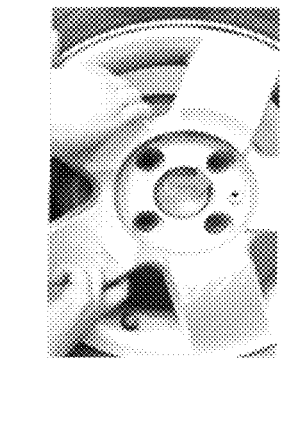
Figure 8B:
Figure 8C:
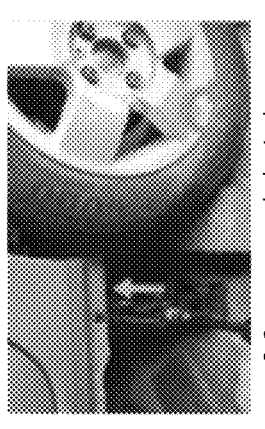
Figure 8C:
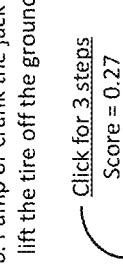
Figure 8C:
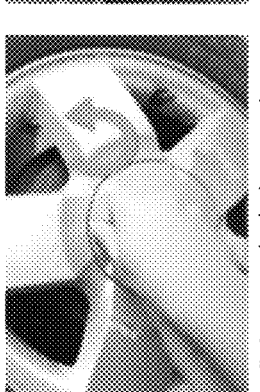
Figure 8C:
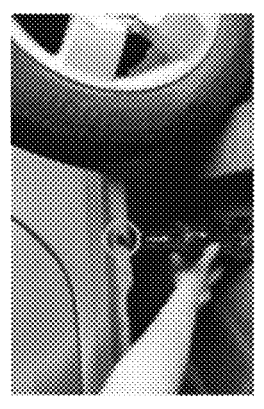
Figure 8C:
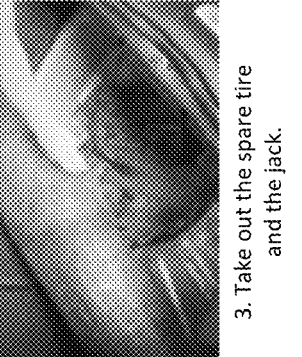

Indeed, as shown in FIG. 8B, upon receiving an indication to expand content of Step 6 via a selection of the digital content item 800, document expansion system 106 provides an expanded set of multimodal content that contains additional granular detail while maintaining the overall relevance and coherence of the selected digital document. Specifically, the document expansion system 106 generates a first expanded content item 802, a second expanded content item 804, and a third expanded content item 806. Furthermore, the document expansion system 106 generates each expanded content item to include an image-text pair with text and digital images extracted from external sources (e.g., one or more digital documents and one or more digital images).

As shown, the document expansion system 106 seamlessly inserts the multimodal content in the ordered sequence of content items to maintain the consistency and flow of the selected digital document. For example, the document expansion system 106 renumbers the steps and/or modify the existing content to facilitate the addition of the content. To illustrate, as shown in FIG. 8B, the document expansion system 106 inserts additional Steps 6, 7, and 8 (e.g., the first expanded content item 802, the second expanded content item 804, and the third expanded content item 806) into the ordered sequence of content items following step 5 and renumbers the subsequent content items to Steps 9, 10, and 11 to adjust for the inserted content (e.g., additional Steps 6, 7, and 8).

In one or more embodiments, the document expansion system 106 modifies the existing content in other ways to insert the new content items into the selected digital document. For example, the document expansion system 106 modifies the formatting of the selected digital document by shifting, resizing, rearranging, removing, or adding content. In additional embodiments, although not shown, the document expansion system 106 inserts the expanded content into the sequence of content items adjacent to the original content Step 6 (e.g., without replacing the original content Step 6, such as by adding sub-steps to the selected content item).

As mentioned, the document expansion system 106 provides the user with the option to expand any of the one or more content items. In one or more implementations, the document expansion system 106 provides additional functionality to indicate if the content item in the selected digital document is already detailed or easy to understand. In particular, the document expansion system 106 displays a predicted number of steps (or expanded content items) that the document expansion system 106 is able to generate.

Furthermore, if the predicted number of expanded content items is equal to or more than a threshold number (e.g., 2 content items), the document expansion system 106 provides a visual indication to the user (e.g., via a specific color, number, shape, or other visual attribute) indicating an amount of supplemental content available that is above a certain threshold. For example, as shown in FIG. 8C, the document expansion system 106 provides an indication (e.g., a first selectable link 808) that Step 4 can be expanded to show only 1 expanded step (e.g., colored red). In contrast, Step 6 provides an indication (e.g., a second selectable link) that Step 6 can be expanded to show 3 expanded steps (e.g., colored green).

Furthermore, in one or more implementations, the document expansion system 106 provides an expandability score. The expandability score indicates whether the document expansion system 106 predicts whether the expanded content items have coherent expansions or not and/or whether the expanded content items will be useful or not. To illustrate, in FIG. 8C, the document expansion system 106 provides an expandability score of 0.10 for Step 4, which indicates the document expansion system 106 predicts the usefulness of the supplemental content (e.g., 1 expanded step) is not as high as other supplemental content (or has a predicted usefulness of 1 out of 10). Additionally, the document expansion system 106 provides an expandability score of 0.07 for Step 5, indicating that although expandable to 3 additional content items, the document expansion system 106 predicts that the supplemental content for Step 5 is not as useful or relevant in comparison to other supplemental content. In contrast, FIG. 8C indicates an expandability score of 0.27 for Step 6 (e.g., selectable link 810), indicating that the document expansion system 106 predicts that the 3 additional content items contain more relevant details for supplementing the instruction of Step 6.

Figure 9B:
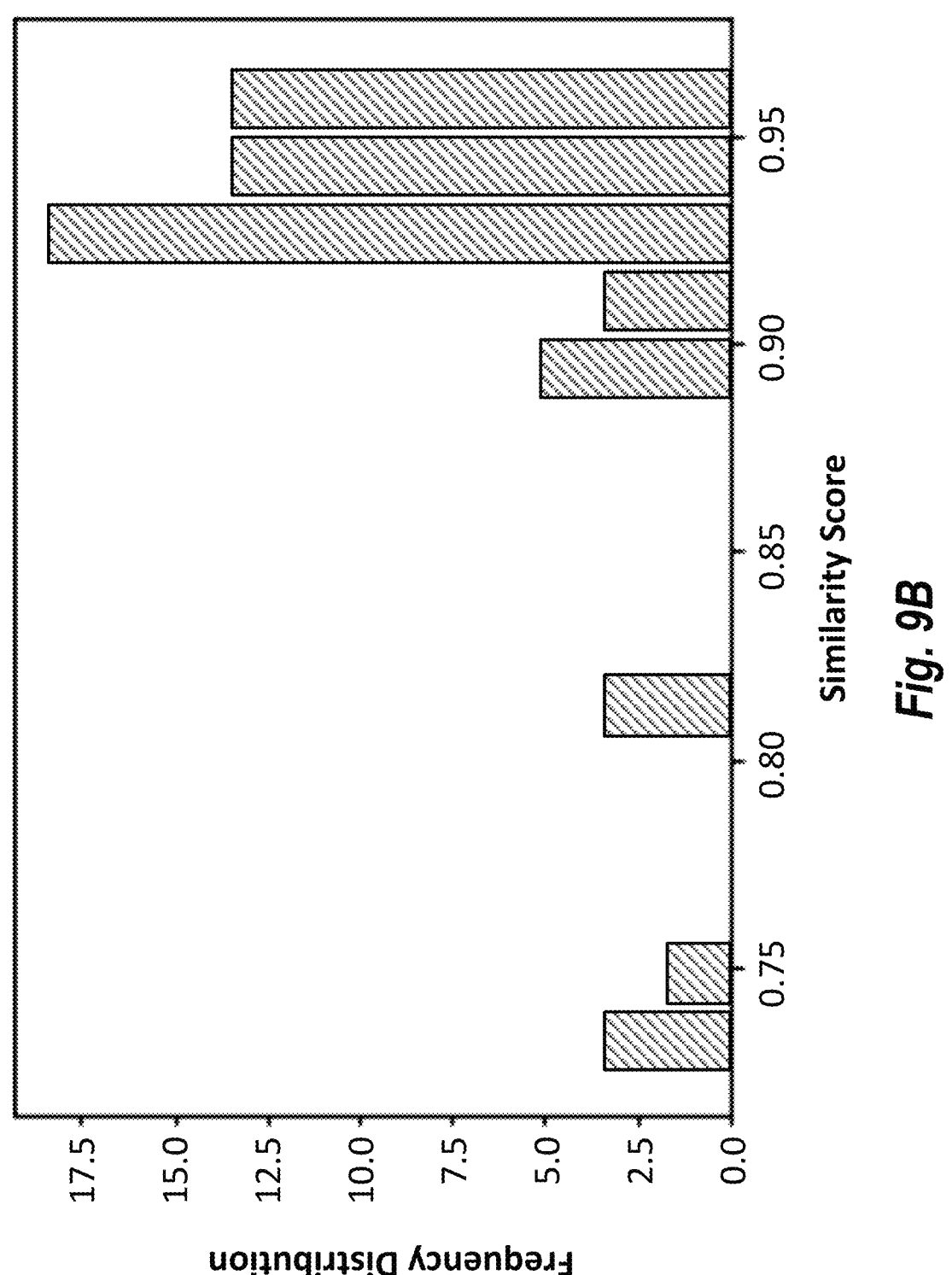

As mentioned, in some embodiments, the document expansion system 106 determines a sequence of multimodal instructional data as input and provides a detail-oriented, expanded document (e.g., multimodal expansion with both text and images) to supplement the instructions in a detail-oriented, expanded digital document. To demonstrate the feasibility of the document expansion system 106, FIGS. 9A-9B illustrate similarity score results for the document expansion system in accordance with one or more embodiments.

In particular, to evaluate the performance of the document expansion system 106, an experiment performed on a dataset compares performance on a dataset including documents that contained detailed instructions for a task in text and image formats. For the evaluation, the experiment extracted a document from the dataset relevant to an input task for use as ground truth documentation for determining the similarity score. The experiment compared expanded textual instructions using the document expansion system 106 to the existing ground truth documentation. The experiment determined a comparison that indicated textual similarities of the document generated by the document expansion system 106 to the ground truth documentation. For example, the experiment determined the dot product of both text documents by calculating the words in each sentence and storing them in frequency vectors for obtaining a similarity score.

To illustrate, T1 represents the ground truth document, T2 represents the retrieved content, and the following are the respective representations of frequency vectors for T1 and T2:

$$v_{T1} = [w_{(11)}, w_{(12)}, \ldots, w_{(1n)}]$$

$$v_{T2} = [w_{(21)}, w_{(22)}, \ldots, w_{(2n)}]$$

where, $w_{(i,j)}$ represents the frequency of jth unique word in Ti file. In one or more embodiments, the similarity score is given by:

$$\text{similarity} = \frac{(v_T 1 \cdot v_T 2)}{|v_T 1||v_T 2|}$$

Running the experiment with textual evaluation metrics on instructional documents from the dataset provided similarities in the range 0.7248498844497583 to 0.9677408805347203. FIG. 9A shows the results of documents representing the top nine out of the fifty testing documents having more than 0.95 similarity, with an average similarity score for all documents being 0.9123354020825873. FIG. 9B illustrates the distribution histogram of all documents, demonstrating that most of the documents had a similarity score in the range 0.90 to 0.95.

Figure 10:
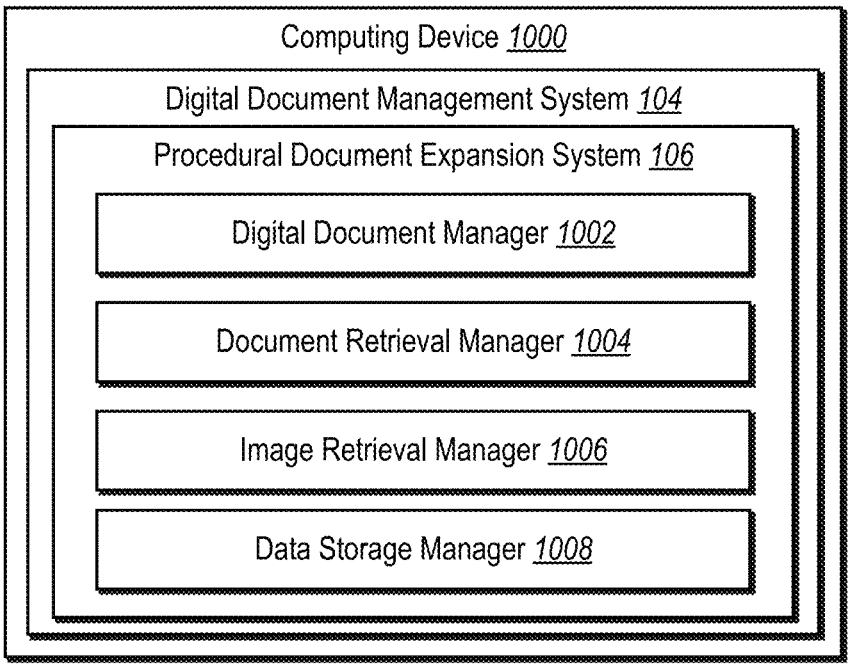
FIG. 10 illustrates a schematic diagram of a document expansion system in accordance with one or more embodiments.

Turning now to FIG. 10, additional detail will now be provided regarding various components and capabilities of the document expansion system 106. In particular, FIG. 10 illustrates the document expansion system 106 implemented by the computing device 1000 (e.g., the server device(s) 102 and/or one of the client devices 110a-110n discussed above with reference to FIG. 1). Additionally, the document expansion system 106 is also part of the digital document management system 104. As shown in FIG. 10, the document expansion system 106 includes, but is not limited to, a digital document manager 1002, a document retrieval manager 1004, an image retrieval manager 1006, and a data storage manager 1008.

As just mentioned, and as illustrated in FIG. 10, the document expansion system 106 includes the digital document manager 1002. In one or more embodiments, the digital document manager 1002 retrieves a selected digital document and a selected content item. As mentioned above, the digital document manager 1002 receives a variety of digital documents including digital documents that incorporate content items including textual content, images, and/or various multimodal content. Furthermore, the digital document manager 1002 identifies selected content item from the digital document. For example, the digital document manager 1002 identifies a user-initiated selection of a multimodal content item comprising an image-text pair within a sequence of content items of the digital document. In one or more embodiments, the digital document manager 1002 communicates with one or more other components (e.g., the document retrieval manager 1004 and the image retrieval manager 1006) to modify a digital document by expanding a selected content item in the digital document.

Additionally, as shown in FIG. 10, the document expansion system 106 includes the document retrieval manager 1004. As mentioned above, the document retrieval manager 1004 retrieves text related to selected content within the selected digital document. In particular, the document retrieval manager 1004 determines related documents from the digital document repository using the text content within the selected content item of the selected digited document to generate the query for retrieval. Indeed, the document retrieval manager 1004 retrieves and generates granular textual content to expand or otherwise supplement the original textual content of the selected content item.

As further shown in FIG. 10, the document expansion system 106 includes the image retrieval manager 1006. In particular, the document expansion system 106 retrieves images based upon keywords, key phrases, and/or abbreviated text content items generated from the selected content item and selects a visually coherent subset from the retrieved images. The image retrieval manager 1006 retrieves relevant images for each of the extracted sentences based on the granular textual content from the document retrieval manager 1004. In some embodiments, the image retrieval manager 1006 re-ranks the images based on the source image to retrieve the most visually coherent images in relation to the images present in the selected digital document.

Additionally, as shown, the document expansion system 106 includes data storage manager 1008 to store and maintain data associated with expanding digital documents with multimodal content. In particular, data storage manager 1008 (implemented by one or more memory devices) stores machine learning models, digital documents (including selected digital documents and digital document repository), images (including image repository), content items, and selected content items.

Each of the components 1002-1008 of the document expansion system 106 can include software, hardware, or both. For example, the components 1002-1008 can include one or more instructions stored on a computer-readable storage medium and executable by processors of one or more computing devices, such as a client device or server device. When executed by the one or more processors, the computer-executable instructions of the document expansion system 106 can cause the computing device(s) to perform the methods described herein. Alternatively, the components 1002-1008 can include hardware, such as a special-purpose processing device to perform a certain function or group of functions. Alternatively, the components 1002-1008 of the document expansion system 106 can include a combination of computer-executable instructions and hardware.

Furthermore, the components 1002-1008 of the document expansion system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1008 of the document expansion system 106 may be implemented as a stand-alone application, such as a desktop or mobile application. Furthermore, the components 1002-1008 of the document expansion system 106 may be implemented as one or more web-based applications hosted on a remote server. Alternatively, or additionally, the components 1002-1008 of the document expansion system 106 may be implemented in a suite of mobile device applications or "apps." For example, in one or more embodiments, the document expansion system 106 can comprise or operate in connection with digital software applications such as, but not limited to, ADOBE® DOCUMENT CLOUD® or ADOBE® ACROBAT® software.

Figure 11:
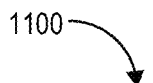
FIG. 11 illustrates a flowchart of a series of acts for inserting supplemental multimodal content into a digital document utilizing machine-learning models in accordance with one or more embodiments.
Figure 11:
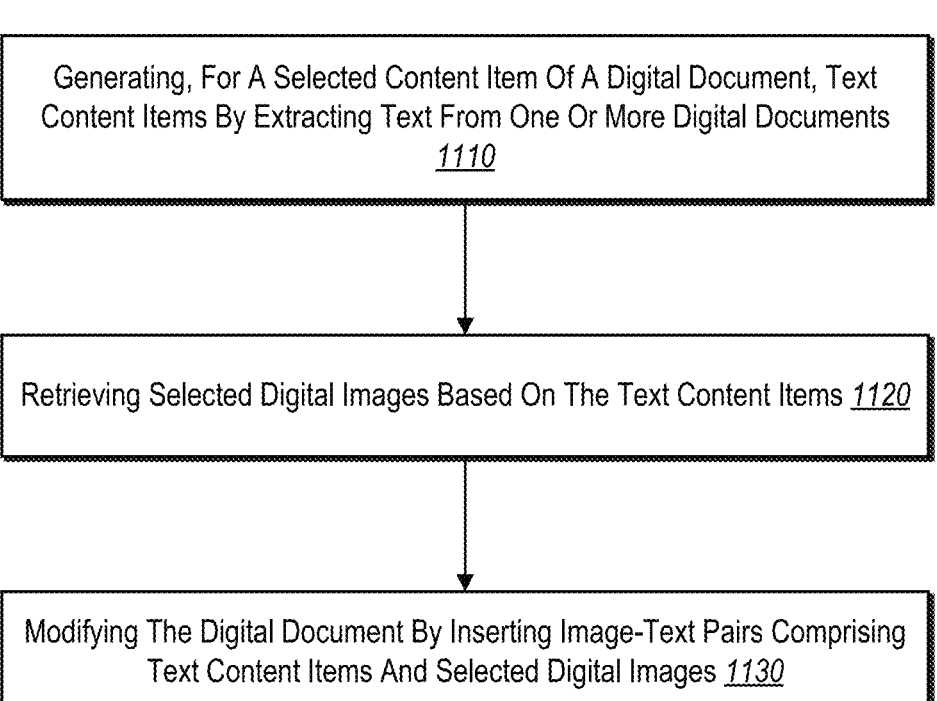

FIGS. 1-10, the corresponding text, and the examples provide a number of different methods, systems, devices, and non-transitory computer-readable media of the document expansion system 106. In addition to the foregoing, one or more embodiments can also be described in terms of flowcharts comprising acts for accomplishing a particular result, as shown in FIG. 11. The acts shown in FIG. 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 11. In some embodiments, a system can be configured to perform the acts of FIG. 11. Alternatively, the acts of FIG. 11 can be performed as part of a computer-implemented method.

As mentioned above, FIG. 11 illustrates a flowchart of a series of acts 1100 for modifying a digital document with a document expansion system 106 in accordance with one or more embodiments. While FIG. 11 illustrates acts according to one embodiment, alternative embodiments may omit, add to, reorder, and/or modify any acts shown in FIG. 11.

FIG. 11 illustrates an example series of acts 1100 for utilizing a document expansion system to expand a digital document. In particular, the series of acts 1100 includes an act 1110 of generating, for a selected content item of a digital document, text content items by extracting text from one or more digital documents. Specifically, the act 1110 can include generating, by at least one processor and for a selected content item from a plurality of content items of a digital document, a plurality of text content items by extracting text from one or more digital documents of a plurality of ranked digital documents of a digital document repository. As illustrated, the series of acts 1100 can also include an act 1120 of retrieving selected digital images based on the text content items. In particular, the act 1120 can include retrieving, by the at least one processor and from an image repository, a plurality of selected digital images based on the plurality of text content items. Moreover, as shown in FIG. 11, the series of acts 1100 can include the act 1130 of modifying the digital document by inserting image-text pairs comprising text content items and selected digital images. In particular, the act 1130 can include modifying, by the at least one processor, the digital document by inserting image-text pairs comprising the plurality of text content items and the plurality of selected digital images in connection with the selected content item.

In addition (or in the alternative) to the acts described above, the document expansion system series of acts 1100 can include detecting the selected content item from the plurality of content items by detecting a selection of an image-text pair within the digital document. Moreover, in one or more embodiments, the document expansion system series of acts 1100 includes determining the plurality of ranked digital documents from the digital document repository by selecting one or more digital documents from the digital document repository based on a similarity of textual content within the one or more digital documents to the selected content item.

Further still, in some embodiments, the document expansion system series of acts 1100 includes generating text content dependency graphs for the extracted text from the one or more digital documents; generating a content item dependency graph for the selected content item; and selecting a subset of the extracted text from the one or more digital documents based on the text content dependency graphs and the content item dependency graph. Moreover, in one or more embodiments, the document expansion system series of acts 1100 includes determining a text content order for the plurality of text content items based on an order of the extracted text in the one or more digital documents; and inserting the plurality of text content items and the plurality of selected digital images in the digital document based on the text content order. In addition, in one or more embodiments, the series of acts 1100 includes modifying the digital document by replacing the selected content item with image-text pairs.

Moreover, in one or more embodiments, the series of acts 1100 includes parsing the plurality of text content items to obtain key phrases associated with the selected content item; and retrieving, from the image repository, the plurality of selected digital images based on the key phrases. Further still, in one or more embodiments, the series of acts 1100 includes parsing the plurality of text content items to obtain the key phrases by extracting a plurality of keywords from the plurality of text content items and generating a set of queries comprising the key phrases based on the plurality of keywords or one or more combinations of the plurality of keywords; and retrieving the plurality of selected digital images by performing digital image searches based on the set of queries comprising the key phrases. Moreover, in one or more embodiments, the series of acts 1100 includes extracting first image features from the plurality of selected digital images; extracting second image features from one or more digital images in the digital document; and selecting the plurality of selected digital images based on the first image features and the second image features.

Furthermore, in one or more embodiments, the series of acts 1100 includes determining, in response to an indication of a selected content item from a plurality of ordered content items of a digital document, a plurality of ranked digital documents from a digital document repository. The series of acts 1100 can also include generating, for the selected content item and utilizing a natural language processing model, a plurality of text content items by comparing text of the selected content item to text extracted from one or more documents of the plurality of ranked digital documents. The series of acts 1100 can further include selecting, from an image repository, a plurality of selected digital images based on one or more queries generated from the plurality of text content items. Additionally, the series of acts 1100 can include modifying the digital document by inserting digital content comprising the plurality of text content items and the plurality of selected digital images into the plurality of ordered content items of the digital document.

Further still, in one or more embodiments, the series of acts 1100 includes determining the indication of the selected content item from the plurality of ordered content items by detecting a selection of an image-text pair within the digital document. Moreover, in one or more embodiments, the series of acts 1100 includes modifying the digital document by inserting digital content comprising the plurality of text content items and the plurality of selected digital images into the plurality of ordered content items adjacent to the selected content item.

In addition, in one or more embodiments, the series of acts 1100 includes determining, in response to an indication of a second selected content item from the plurality of ordered content items of the digital document, a second plurality of ranked digital documents from the digital document repository. The series of acts 1100 can include generating, for the selected content item, a second plurality of text content items by extracting text from one or more documents of the second plurality of ranked digital documents. The series of acts 1100 can also include retrieving, from the image repository, a second plurality of selected digital images based on the plurality of text content items. The series of acts 1100 can further include modifying, the digital document by inserting second digital content comprising the second plurality of text content items and the second plurality of selected digital images in connection with the second selected content item.

Moreover, in one or more embodiments, the series of acts 1100 includes determining, in response to an indication of a selected content item from a plurality of content items of a digital document, a plurality of ranked digital documents from a digital document repository. The series of acts 1100 can also include generating, for the selected content item, a plurality of text content items by extracting text from one or more documents of the plurality of ranked digital documents. The series of acts 1100 can further include retrieving, from an image repository, a plurality of selected digital images based on the plurality of text content items. Additionally, the series of acts 1100 can include modifying, the digital document by inserting digital content comprising the plurality of text content items and the plurality of selected digital images in connection with the selected content item.

Further still, in one or more embodiments, the series of acts 1100 includes parsing the plurality of text content items to obtain key phrases associated with the selected content item; generating an abbreviated text content item from the plurality of text content items by removing stop-words from the plurality of text content items; and retrieving the plurality of selected digital images comprises performing digital image searches based queries comprising the key phrases and the abbreviated text content item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
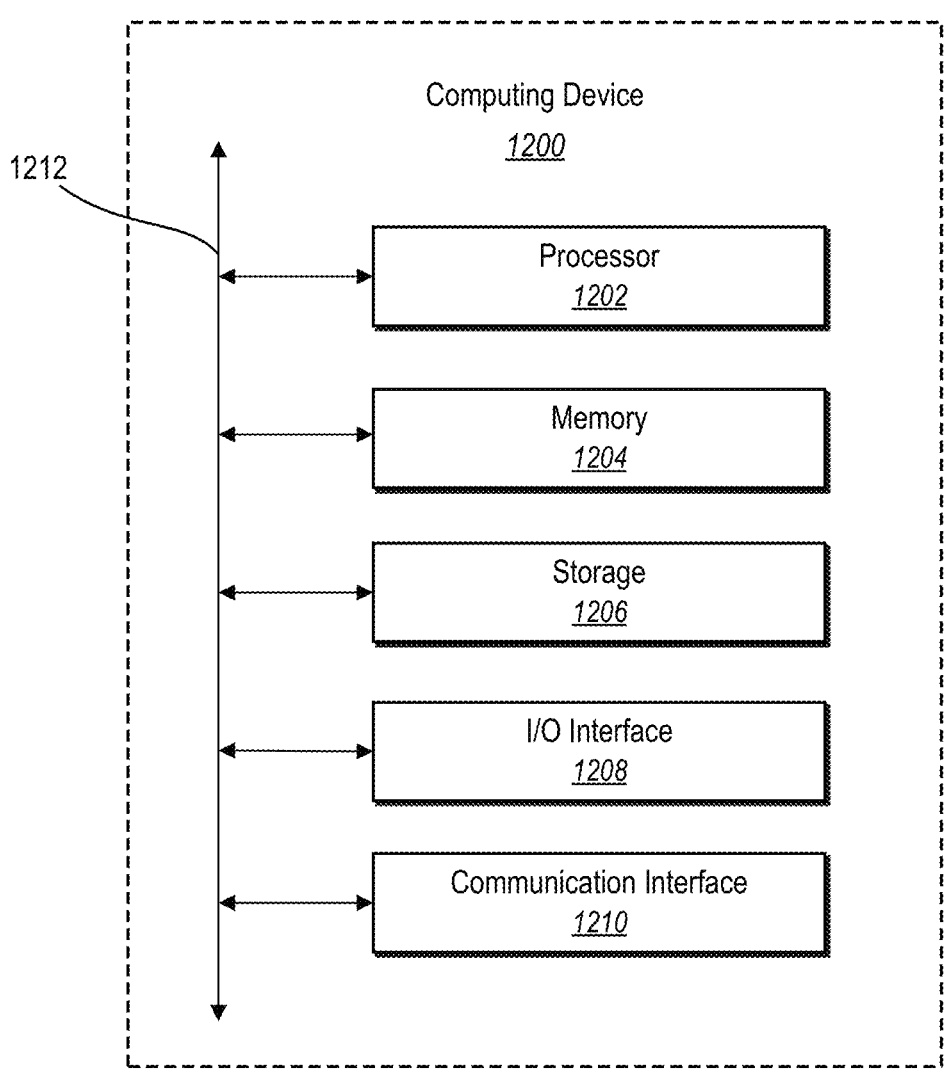
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., server device(s) 102, client devices 110a-110n, and computing device 1200). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
    generating, by at least one processor and for a selected content item from a plurality of content items of a selected digital document, a plurality of extracted text content items by extracting text from one or more digital documents of a plurality of ranked digital documents of a digital document repository, wherein the plurality of extracted text content items correspond to supplemental textual content comprising granular detail related to the selected content item;

retrieving, by the at least one processor and from an image repository, a plurality of selected digital images based on the plurality of extracted text content items; and modifying, by the at least one processor, the selected digital document by inserting image-text pairs comprising the plurality of extracted text content items and the plurality of selected digital images in connection with the selected content item.

2. The computer-implemented method of claim 1, further comprising detecting the selected content item from the plurality of content items by detecting a selection of an image-text pair within the selected digital document.

3. The computer-implemented method of claim 1, wherein determining the plurality of ranked digital documents from the digital document repository comprises selecting one or more digital documents from the digital document repository based on a similarity of textual content within the one or more digital documents to the selected content item.

4. The computer-implemented method of claim 1, wherein generating the plurality of extracted text content items comprises:

generating text content dependency graphs for the extracted text from the one or more digital documents;

generating a content item dependency graph for the selected content item; and selecting a subset of the extracted text from the one or more digital documents based on the text content dependency graphs and the content item dependency graph.

5. The computer-implemented method of claim 4, wherein modifying the selected digital document comprises:

determining a text content order for the plurality of extracted text content items based on an order of the extracted text in the one or more digital documents; and inserting the plurality of extracted text content items and the plurality of selected digital images in the selected digital document based on the text content order.

6. The computer-implemented method of claim 1, wherein modifying the selected digital document comprises replacing the selected content item with the image-text pairs.

7. The computer-implemented method of claim 1, wherein retrieving the plurality of selected digital images comprises:

parsing the plurality of extracted text content items to obtain key phrases associated with the selected content item; and retrieving, from the image repository, the plurality of selected digital images based on the key phrases.

8. The computer-implemented method of claim 7, wherein:

parsing the plurality of extracted text content items to obtain the key phrases comprises:

extracting a plurality of keywords from the plurality of extracted text content items; and generating a set of queries comprising the key phrases based on the plurality of keywords or one or more combinations of the plurality of keywords; and retrieving the plurality of selected digital images comprises performing digital image searches based on the set of queries comprising the key phrases.

9. The computer-implemented method of claim 1, wherein determining the plurality of selected digital images comprises:

extracting first image features from the plurality of selected digital images;

extracting second image features from one or more digital images in the selected digital document; and selecting the plurality of selected digital images based on the first image features and the second image features.

10. A system comprising:

one or more memory devices comprising a digital document; and one or more processors configured to cause the system to:

determine in response to an indication of a selected content item from a plurality of ordered content items of a selected digital document, a plurality of ranked digital documents from a digital document repository;

generate, for the selected content item and utilizing a natural language processing model, a plurality of text content items by comparing text of the selected content item to text extracted from one or more documents of the plurality of ranked digital documents, wherein the text extracted from the one or more documents corresponds to supplemental textual content comprising granular detail related to the selected content item;

select, from an image repository, a plurality of selected digital images based on one or more queries generated from the plurality of text content items; and modify the selected digital document by inserting digital content comprising the plurality of text content items and the plurality of selected digital images into the plurality of ordered content items of the selected digital document.

11. The system of claim 10, where the one or more processors are further configured to cause the system to determine the indication of the selected content item from the plurality of ordered content items by detecting a selection of an image-text pair within the selected digital document.

12. The system of claim 10, where the one or more processors are further configured to cause the system to generate the plurality of text content items by:

generating text content dependency graphs for the extracted text from the plurality of ranked digital documents;

generating a content item dependency graph for the selected content item; and selecting a subset of the extracted text from the plurality of ranked digital documents based on the text content dependency graphs and the content item dependency graph.

13. The system of claim 12, where the one or more processors are further configured to cause the system to modify the selected digital document by:

determining a text content order for the plurality of text content items based on an order of the extracted text in the plurality of ranked digital documents; and inserting the plurality of text content items and the plurality of selected digital images in the selected digital document based on the text content order.

14. The system of claim 10, where the one or more processors are further configured to cause the system to modify the selected digital document by inserting digital content comprising the plurality of text content items and the plurality of selected digital images into the plurality of ordered content items adjacent to the selected content item.

15. The system of claim 10, where the one or more processors are further configured to cause the system to retrieve the plurality of selected digital images by:

parsing the plurality of text content items to obtain key phrases associated with the selected content item; and retrieving, from the image repository, the plurality of selected digital images based on the one or more queries comprising the key phrases.

16. The system of claim 10, where the one or more processors are further configured to cause the system to:

determining, in response to an indication of a second selected content item from the plurality of ordered content items of the digital document, a second plurality of ranked digital documents from the digital document repository;

generating, for the selected content item, a second plurality of text content items by extracting text from one or more documents of the second plurality of ranked digital documents;

retrieving, from the image repository, a second plurality of selected digital images based on the plurality of text content items; and modifying, the selected digital document by inserting second digital content comprising the second plurality of text content items and the second plurality of selected digital images in connection with the second selected content item.

17. A non-transitory computer readable medium storing executable instructions which, when executed by a processing device, cause the processing device to perform operations comprising:

determining, in response to an indication of a selected content item from a plurality of content items of a selected digital document, a plurality of ranked digital documents from a digital document repository;

generating, for the selected content item, a plurality of text content items by extracting text from one or more documents of the plurality of ranked digital documents, wherein the text from the one or more documents corresponds to supplemental textual content comprising granular detail related to the selected content item;

retrieving, from an image repository, a plurality of selected digital images based on the plurality of text content items; and modifying, the selected digital document by inserting digital content comprising the plurality of text content items and the plurality of selected digital images in connection with the selected content item.

18. The non-transitory computer readable medium of claim 17, wherein determining the plurality of selected digital images comprises:

extracting first image features from the plurality of selected digital images;

extracting second image features from one or more digital images in the selected digital document; and selecting the plurality of selected digital images based on the first image features and the second image features.

19. The non-transitory computer readable medium of claim 17, wherein retrieving the plurality of selected digital images comprises:

parsing the plurality of text content items to obtain key phrases associated with the selected content item;

generating an abbreviated text content item from the plurality of text content items by removing stop-words from the plurality of text content items; and retrieving the plurality of selected digital images comprises performing digital image searches based on queries comprising the key phrases and the abbreviated text content item.

20. The non-transitory computer readable medium of claim 17, wherein the executable instructions cause the processing device to perform operations further comprising:

determining, in response to an indication of a second selected content item from the plurality of content items of the selected digital document, a second plurality of ranked digital documents from the digital document repository;

generating, for the selected content item, a second plurality of text content items by extracting text from one or more documents of the second plurality of ranked digital documents;

retrieving, from the image repository, a second plurality of selected digital images based on the plurality of text content items; and modifying, the selected digital document by inserting second digital content comprising the second plurality of text content items and the second plurality of selected digital images in connection with the second selected content item.

* * * * *